United States Patent
Hamond et al.

(10) Patent No.: US 10,367,413 B2
(45) Date of Patent: Jul. 30, 2019

(54) RESONANT SYSTEM CONTROLLER AND CYCLE-BY-CYCLE PREDICTIVE SOFT SWITCHING

(71) Applicant: Pre-Switch, Inc., Raleigh, NC (US)

(72) Inventors: James Hamond, Lake Oswego, OR (US); Jarrod Tuma, Portland, OR (US)

(73) Assignee: Pre-Switch, Inc., Raleigh, NC (US)

( * ) Notice: Subject to any disclaimer, the term of this patent is extended or adjusted under 35 U.S.C. 154(b) by 35 days.

(21) Appl. No.: 15/312,170

(22) PCT Filed: Jul. 22, 2016

(86) PCT No.: PCT/US2016/043764
§ 371 (c)(1),
(2) Date: Nov. 17, 2016

(87) PCT Pub. No.: WO2017/015641
PCT Pub. Date: Jan. 26, 2017

(65) Prior Publication Data
US 2017/0179814 A1    Jun. 22, 2017

Related U.S. Application Data

(60) Provisional application No. 62/195,786, filed on Jul. 22, 2015.

(51) Int. Cl.
*H02M 1/00* (2006.01)
*H02M 1/44* (2007.01)
(Continued)

(52) U.S. Cl.
CPC .............. *H02M 1/44* (2013.01); *H02M 1/00* (2013.01); *H02M 1/14* (2013.01); *H02M 3/158* (2013.01);
(Continued)

(58) Field of Classification Search
CPC ............ H02M 1/00; H02M 1/14; H02M 1/44; H02M 2001/0054; H02M 2001/0058;
(Continued)

(56) References Cited

U.S. PATENT DOCUMENTS 6,188,587 B1    2/2001  Yun et al.
6,580,255 B1    6/2003  Wittenbreder, Jr.
(Continued)

OTHER PUBLICATIONS

Andreycak, "Zero Voltage Switching Resonant Power Conversion", Texas Instrument Incorporated, available at http://www.ti.com/lit/an/slua159/slua159.pdf, 1999, 28 pages.
(Continued)

*Primary Examiner* — Jue Zhang
*Assistant Examiner* — Lorena D Bruner
(74) *Attorney, Agent, or Firm* — Stoel Rives LLP; Robert R. Teel

(57) ABSTRACT

Disclosed techniques achieve soft-switching conditions by determining relative timing of switch states and events, and making recurring timing adjustments in successive cycles (i.e., cycle-by-cycle) to reduce timing errors that introduce switching losses. Timing adjustments provide a prediction of when an optimal soft-switching condition will exist during a subsequent cycle so that switch-actuation signals are provided, irrespective of inherent signaling and feedback delays, in advance of actually observing the condition, thereby subsequently changing a switching state within a desired threshold of the targeted soft-switching condition. Error in the prediction is observed and compensating corrections applied during the next cycle. The predictive nature of the timing corrections provides for rapid convergence on, and recurring refinement of, optimal timing parameters for multiple opposing switches that are coordinated so that the system (be it self- or forced-resonant circuitry) operates at
(Continued)

high efficiency with minimal hard-switching or diode conduction losses.

22 Claims, 31 Drawing Sheets

(51) Int. Cl.
*H02M 3/158* (2006.01)
*H02M 1/14* (2006.01)
*H02M 7/5387* (2007.01)

(52) U.S. Cl.
CPC .......... *H02M 7/53871* (2013.01); *H02M 2001/0054* (2013.01); *H02M 2001/0058* (2013.01); *Y02B 70/1425* (2013.01); *Y02B 70/1491* (2013.01)

(58) Field of Classification Search
CPC .......... H02M 3/158; H02M 7/53871; Y02B 70/1425; Y02B 70/1491
See application file for complete search history.

(56) References Cited

U.S. PATENT DOCUMENTS

| | | | |
|---|---|---|---|
| 7,714,548 B1 | 5/2010 | Wittenbreder, Jr. | |
| 8,976,543 B1* | 3/2015 | Zheng | H02M 1/38 363/17 |
| 9,257,913 B1* | 2/2016 | McDonald | H02M 3/33569 |
| 2004/0246756 A1 | 12/2004 | Bijlenga et al. | |
| 2005/0017707 A1 | 1/2005 | Ramesh et al. | |
| 2008/0088289 A1 | 4/2008 | Fogg et al. | |
| 2010/0226050 A1* | 9/2010 | Koo | H02M 3/3376 361/18 |
| 2010/0315152 A1* | 12/2010 | Zhang | H02M 3/158 327/434 |
| 2011/0261596 A1 | 10/2011 | Zong et al. | |
| 2012/0182003 A1 | 7/2012 | Flaibani et al. | |
| 2012/0262139 A1* | 10/2012 | Moussaoui | H02M 1/44 323/282 |
| 2013/0141945 A1 | 6/2013 | Karlsson et al. | |
| 2014/0092646 A1 | 4/2014 | Cleveland et al. | |
| 2014/0098578 A1 | 4/2014 | Halberstadt | |
| 2014/0191735 A1 | 7/2014 | Zhao | |
| 2014/0286056 A1* | 9/2014 | Yoon | H02M 3/33569 363/21.03 |

OTHER PUBLICATIONS

Doudousakis, et al., "Achieving ZVS in a Two Quadrant Converter Using a Simplified Auxiliary Circuit with Novel Control", available at http://ieeexplore.ieee.org/abstract/document/4592295/, 2008, 9 pages.
Edelmoser, et al., "Switching Loss Reduction of PT- and NPT-IGBT", International Conference on Circuits, Systems, Communications and Computers 1999 Proceedings, published by World Scientific and Engineering Academy and Society, pp. 3851-3856, available at http://www.wseas.us/e-library/conferences/athens1999/Papers/385.pdf, 1999, 6 pages.
Everts, et al., "Optimal ZVS Modulation of Single-Phase Single-Stage Bidirectional DAB AC-DC Converters", IEEE Transactions on Power Electronics, vol. 29, No. 8, pp. 3954-3970, available at http://ieeexplore.ieee.org/document/6671445/, Aug. 2014, 18 pages.
Hanson, "Implementing Closed-Loop Control Algorithms for DC-to-DC Converter and ARCP Inverter Using the Universal Controller", Naval Postgraduate School, available at http://calhoun.nps.edu/handle/10945/8509, Jun. 1997, 152 pages.
Herbst, et al., "High Power Density and High Efficiency Converter Topologies for Electric Ships", IEEE Electric Ship Technologies Symposium IEEE ESTS 2013, available at http://hdl.handle.net/2152/30786, Apr. 2013, 6 pages.
Kamil, et al., "Switch Mode Power Supply (SMPS) Topologies (Part I)", Microchip Technology Inc., available at http://ww1.microchip.com/downloads/en/AppNotes/01114A.pdf, Sep. 10, 2007, 48 pages.
Noon, et al., "UC3855A/B High Performance Power Factor Preregulator", Texas Instrument Incorporated, available at http://www.ti.com/lit/an/slua146a/slua146a.pdf, May 1996, revised Apr. 2004, 35 pages.
Smith, Jr., et al., "A Comparison of Voltage-Mode Soft-Switching Methods for PWM Converters", IEEE Transactions on Power Electronics, vol. 12, No. 2, pp. 376-386, available at http://ieeexplore.ieee.org/document/558774/, Mar. 1997, 10 pages.
Walters, et al., "Analysis of the Auxiliary Resonant Commutated Pole Inverter", Purdue University ECE Technical Reports, available at http://docs.lib.purdue.edu/cgi/viewcontent.cgi?article=1144&context=ecetr, Aug. 1, 1995, 67 pages.
Yu, "Driver Based Soft Switch for Pulse-Width-Modulated Power Converters", Virginia Polytechnic Institute and State University, available at https://theses.lib.vt.edu/theses/available/etd-03092005-002643/unrestricted/Softswitch.pdf, Feb. 23, 2005, 187 pages.
Everts, et al., "Optimal ZVS Modulation of Single-Phase Single-Stage Bidirectional DAB AC-DC Converters", IEEE Transactions on Power Electronics, vol. 29, No. 8, pp. 3954-3970, available at http://ieeexplorer.ieee.org/document/6671445/, Aug. 2014, 18 pages.
Kamil, "Switch Mode Power Supply (SMPS) Topologies (Part I)", Microchip Technology Inc., available at http://ww1.microchip.com/downloads/en/AppNotes/01114A.pdf, Sep. 10, 2007, 48 pages.
Noon, "UC3855A/B High Performance Power Factor Preregulator", Texas Instrument Incorporated, available at http://www.ti.com/lit/an/slua146a/slua146a.pdf, May 1996, revised Apr. 2004, 35 pages.
Funk,Tobias et al.,"A 20 V, 8 MHz Resonant DCDC Converter with Predictive Control for 1 ns Resolution Soft-Switching", IEEE International Symposium on Circuits and Systems (ISCAS), May 2015, 4 pages.
Mappus,Steve et al.,"Predictive Gate Drive™ Boosts Synchronous DC/DC Power Converter Efficiency", Texas Instruments Application Report, Available at: URL:http://www.ti.com/lit/an/slua281/slua281.pdf, Apr. 2003, 26 pages.

* cited by examiner

RESONANT SYSTEM CONTROLLER AND CYCLE-BY-CYCLE PREDICTIVE SOFT SWITCHING

RELATED APPLICATIONS

This application is the National Stage of International Application No. PCT/US2016/043764, filed Jul. 22, 2016, which claims benefit of U.S. Provisional Patent Application No. 62/195,786, filed Jul. 22, 2015, both of which are hereby incorporated by reference.

TECHNICAL FIELD

The present disclosure generally relates to soft-switching electrical circuitry, including zero voltage switching (ZVS) and zero current switching (ZCS), and, more particularly to cycle-by-cycle control of soft-switching circuitry.

BACKGROUND INFORMATION

While conventional soft-switching attempts exist in various technical literature, there are inherent issues limiting the use of those conventional designs in commercial systems. These limitations include conduction and reverse recovery of metal-oxide-semiconductor field-effect transistor (MOSFET) body and conventional diodes, insulated-gate bipolar transistor (IGBT) tail currents, and parasitic inductance and capacitance of all circuitry components present in the conventional designs.

Some attempts to address these issues have included designs employing fast-switching (more expensive) wide bandgap devices such as silicon carbide (SiC) transistor devices in lieu of slower (less expensive) IGBT devices. Other attempts to address the aforementioned issues have included single-cycle control schemes that extrapolate, during a single cycle, values of a voltage across a switch so as to estimate a time at which to soft switch moments later during the same cycle. The extrapolation techniques, however, cannot accurately estimate the ZVS timing because observed values of the voltage typically include spurious noise compromising the extrapolation and because of inherent delays between the switch being activated and its actual time at which it is conductive. The inaccurate estimates, therefore, actually indicate a time where hard switching or body diode conduction losses would occur.

SUMMARY OF THE DISCLOSURE

This disclosure describes cycle-by-cycle predictive soft-switching control techniques for power electronics such as switch-mode power supplies (SMPS). The adaptive switch-control technology adjusts the timing of switching signals so that switches, such as MOSFETs or IGBTs, can soft switch, thereby reducing switching losses and electromagnetic interference (EMI) effects. According to one embodiment, a resonant system controller (RSC) provides optimal switch-activation timing based on a timing error detected during a first cycle and compensated for during a second cycle, thereby achieving soft switching during the second cycle. The timing error, in some embodiments, is derived based on a difference between a time at which a voltage (e.g., a switching-node voltage) across a switch is at a detected minimum and a time at which the switch was actuated during the first cycle.

Also disclosed are examples of a soft-switching topologies, such as a switch-activated snubber circuit, having a resonant system operatively associated with the RSC.

Additional aspects and advantages will be apparent from the following detailed description of embodiments, which proceeds with reference to the accompanying drawings.

DETAILED DESCRIPTION OF EMBODIMENTS

Introduction

This disclosure summarizes several types of problems that a range of switches may possess and explains why cycle-by-cycle predictive soft switching (PSS) of switches enhances efficiency. Whether it be a relay, IGBT, bipolar junction transistor (BJT), MOSFET, SiC transistor, or gallium nitride (GaN) power transistor, all types of switches have non-ideal characteristics that cause losses during transitions between on and off states. Any time a device has both current through and volts across it, there is an energy loss, generally lost as heat. By ensuring that either current through or voltage applied to a device is zero (or about zero), even during transitions, the aforementioned losses will be minimized.

Techniques to achieve such soft-switching conditions generally include determining relative timing of switch states and events, and then making recurring timing adjustments in successive cycles (i.e., cycle-by-cycle) to thereby reduce timing errors and achieve soft switching. These timing adjustments essentially provide a prediction of when an optimal soft-switching condition will exist during a subsequent cycle so that gate switch-actuation signals may be applied in advance of observing that condition, irrespective of inherent signaling and feedback delays, thereby changing a switching state within a desired threshold of the soft-switching condition. Error in the prediction is then observed so that compensating corrections may be applied during the next cycle. The predictive nature of the timing corrections provides for rapid convergence on, and recurring refinement of, optimal timing parameters for multiple opposing switches that are coordinated so that the system (be it self- or forced-resonant circuitry) operates at high efficiency with minimal hard-switching or diode-conduction losses.

Figure 1:
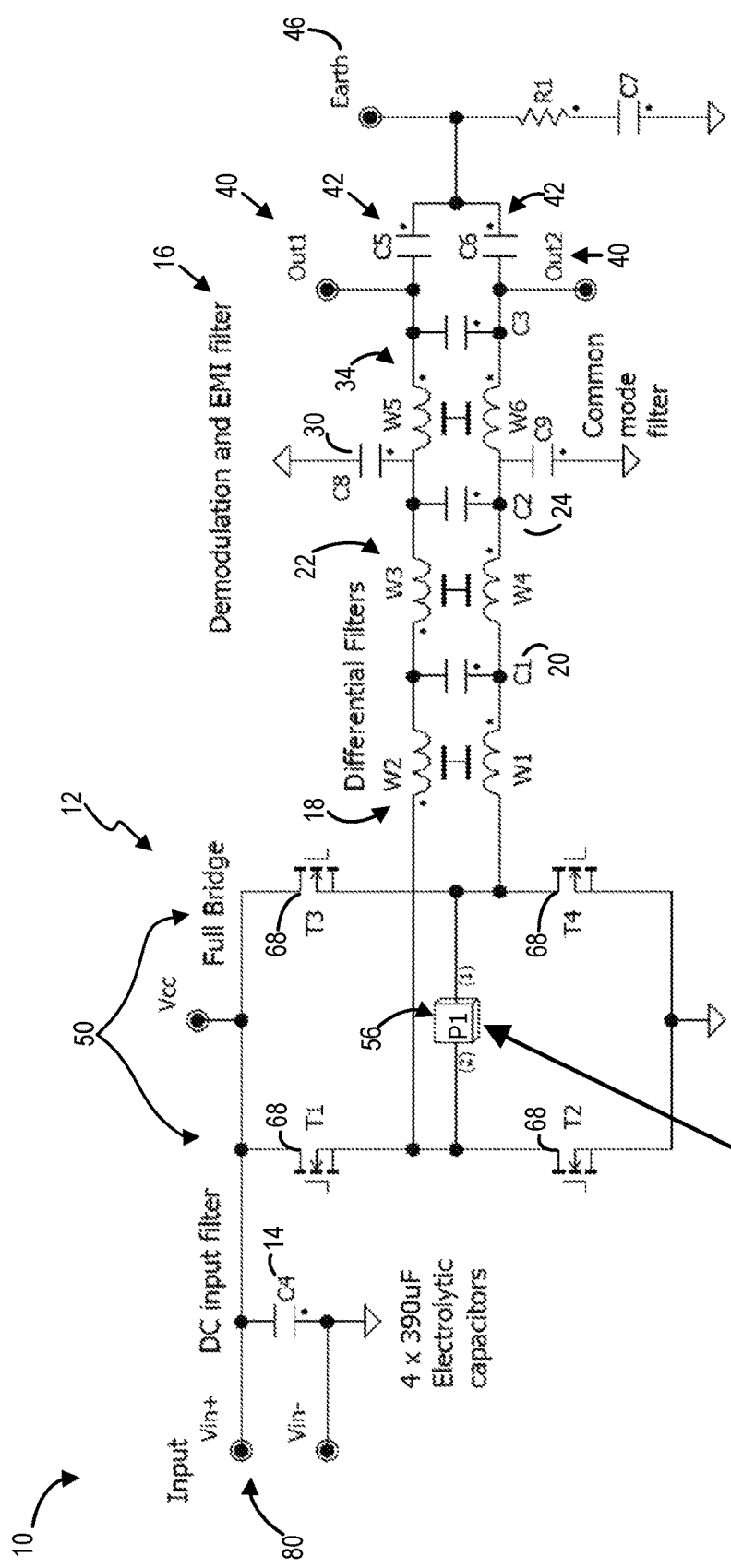
FIG. 1 is an annotated and simplified switch-level electrical schematic diagram of a soft-switching class-D full-bridge inverter including an output filter.
Figure 7:
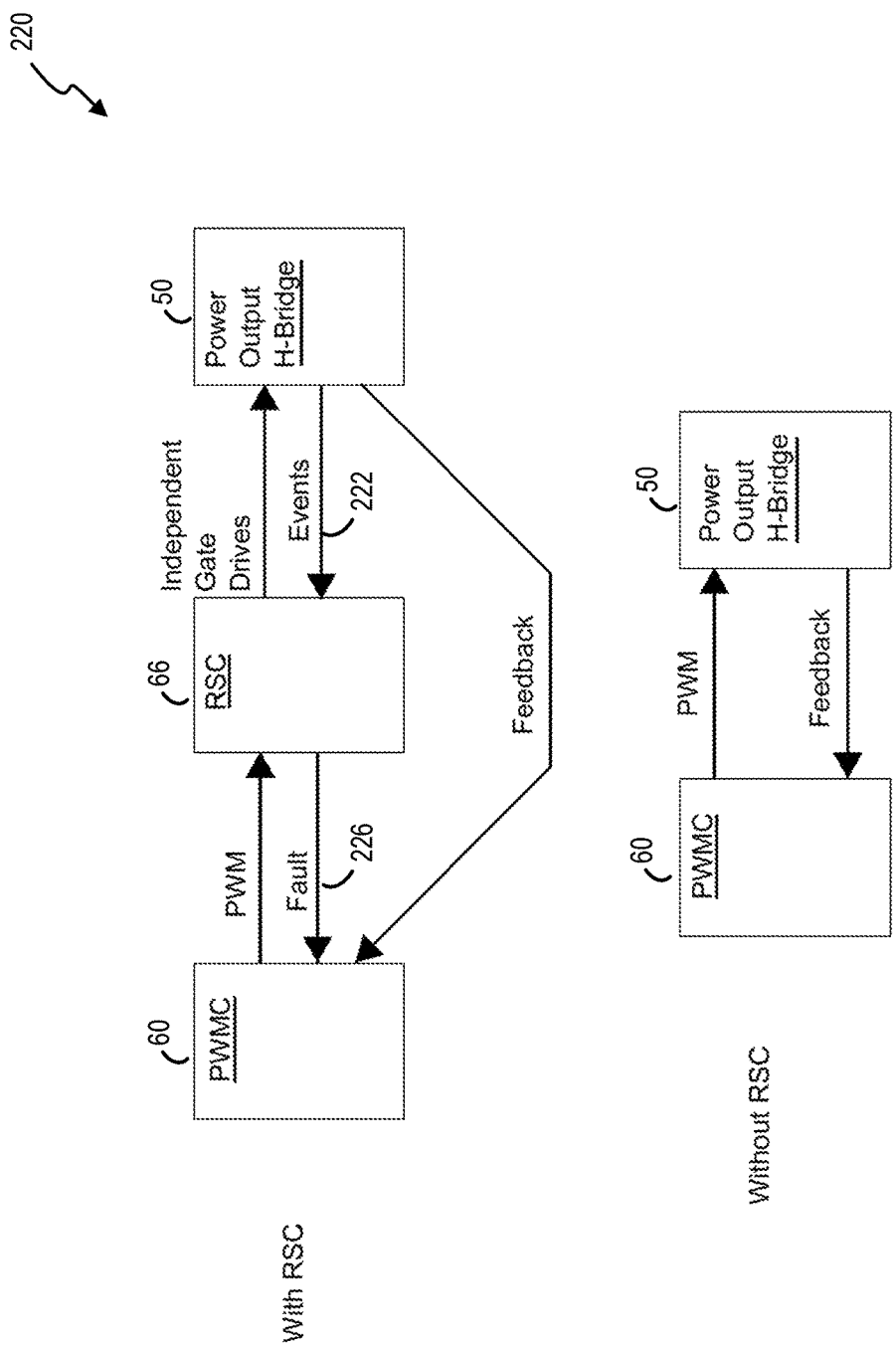
FIG. 7 shows block diagrams of inverter designs with and without an RSC.
Figure 8:
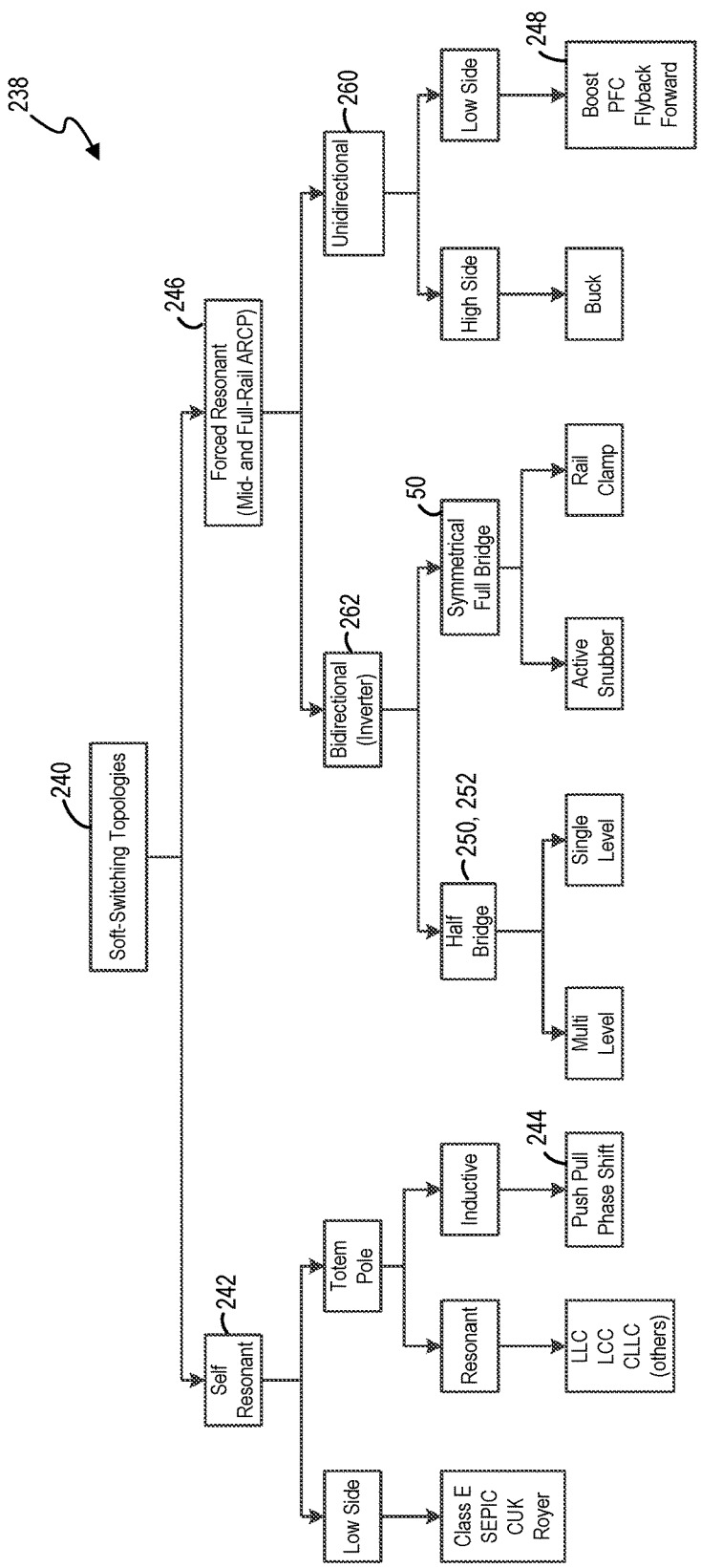
FIG. 8 is a hierarchy diagram of soft-switching topologies suitable for use with the cycle-by-cycle predictive soft-switching control techniques of the present disclosure.
Figure 31:
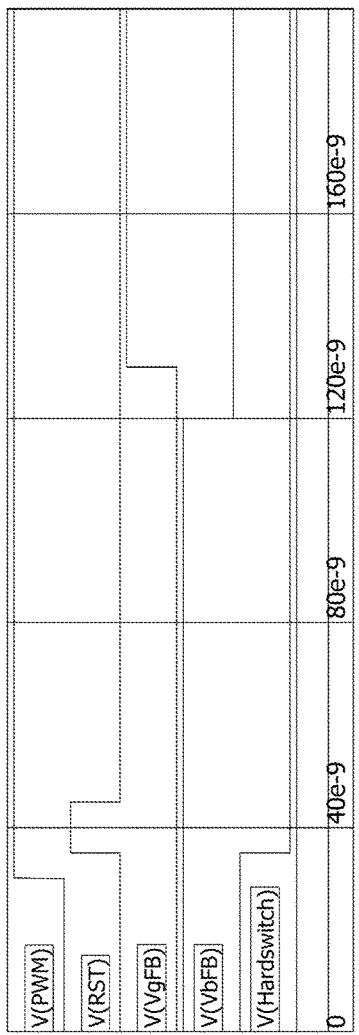
FIGS. 31 and 32 are timing diagrams for the circuitry of FIG. 30.
Figure 32:
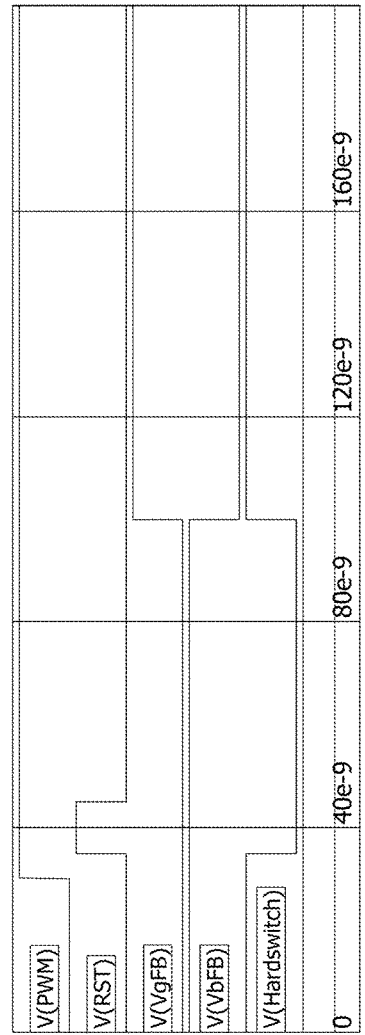

This disclosure includes the following subsections. First, a detailed description of FIG. 1 provides a complete, end-to-end example of soft-switching technology, embodied in a class-D full-bridge inverter, having a resonant drive component (P1) and an output filter stage. Second, FIGS. 2-4 and associated description set forth high-level examples of half bridges facilitating discussion of aspects of the RSC and soft-switching ARCP technology. Third, FIGS. 5 and 6 and associated description provide further details of RSC switching circuitry (e.g., P1 of FIG. 1) and PSS switch-control timing of a disclosed inverter. Fourth, FIGS. 7 and 8 provide overviews of how cycle-by-cycle PSS techniques may be used generally to enhance a wide variety of SMPS circuitry and topologies. Fifth, FIGS. 9-29 and associated description show more specific examples of the enhancements in the context of self-resonant and ARCP circuitry. Sixth, a description of hard-switching detection (i.e., event detection) circuitry is set forth with reference to FIGS. 30-32.

Soft-Switching, Class-D Full-Bridge Inverter

FIG. 1 shows a power stage circuit 10 including a split phase, class-D full-bridge inverter 12. The pertinent passive component values shown in FIG. 1 are as follows. For input current ripple filtering, inverter 12 uses four 390 μF, 450 VDC electrolytic capacitors (Ecaps) 14. An output filter 16 includes a differential mode, quad filter enamel, 100 μH RM12 18, custom profile, gapped core. There is a 1 μF film capacitor 20 across the output of RM12 18, followed by a toroid differential mode filter 22 with ceramic caps 24, followed by a further common mode filter 30 with more ceramic capacitors and snubbers 34. Outputs 40 are capacitively coupled 42 to ground 46.

With respect to semiconductor device types, the system design of FIG. 1 may use a variety of switches. Slower switching parts were used for a main power bridge (T1-T4 in FIG. 1; S1-S4 in FIG. 5) 50, and very high speed, but higher Rds parts were used for a resonant system (P1, which is a subject of FIG. 5) 56. According to one embodiment, application-specific SiC MOSFETs (obtained from Cree Inc. of Durham, N.C.) were employed, as these MOSFETs have ultra-low output capacitance, suitable reverse recovery and Rds, and relatively stable Rds over a broad temperature range.

A pulse-width modulation controller (PWMC) (FIG. 5) 60 encodes a 60 Hz sine wave as a pulse-width modulated (PWM) encoder carrier signal (i.e., a pulse train) that modulates from about 200 KHz up to about 1 MHz. According to some embodiments, the PWMC is an asynchronous carrier, high-speed class-D amplifier developed by Indice Semiconductor Inc. of Tualatin, Oreg., and referred to as a Continuous Sigma™ amplifier. More generally, Continuous Sigma refers to Indice's asynchronous signal-encoding technology.

An example of the aforementioned Continuous Sigma amplifier is described in International Application No. PCT/US2015/038690, titled, "Asynchronous Electrical Circuitry Techniques for Producing Stationary Carrier Signal to Encode Input Signal Amplitude Into Output Signal Time-Sequence Information," filed Jun. 30, 2015, which is incorporated herein by reference in its entirety. In short, however, where typical systems rely on synchronous designs, Continuous Sigma systems operate asynchronously. This unrestricted, asynchronous approach allows much higher frequencies of operation, and therefore uses a completely new control paradigm to ensure convergent behavior. The asynchronous approach has been applied to a wide range of seemingly unrelated areas such as lighting, audio, signal encoding, and soft-switching applications. Accordingly, this disclosure includes an example of the Continuous Sigma paradigm deployed in the context of the latter, soft-switching applications.

For some inverter applications, P1, e.g., a field-programmable gate array (FPGA), generates a 40 KHz PWM carrier synthesizing a 60 Hz sine wave, which is low-pass filtered to form an analog version the 60 Hz sine wave. The analog waveform is then applied as the input to PWMC 60 that encodes the analog waveform using Continuous Sigma technology to generate a wideband inverter input signal that an RSC 66 (FIG. 5) receives to perform gate switching. An advantage afforded by the use of Continuous Sigma PWM modulation is that the maximum frequency occurs at the output low loads, which means that the system is at its most lossy when the output is at no load. This aids to reduce the ripple as seen by the supply by partially cancelling the low point of the current.

RSC 66 then uses PWM signal transitions to apply a controlled sequence of switch-control signals to gates of power switches 68 (T1-T4) and of resonate drive MOSFETs 70 (S5 and S6 FIG. 5) of P1 56. The switch-control signals are adaptively timed by RSC 66 based on a detected value of switching node 74 (e.g., Vbridge1, FIG. 5) and on a previous amount switch-activation timing error. Additional details of RSC 66 and its control techniques are described in subsequent paragraphs of this disclosure.

Figure 5:
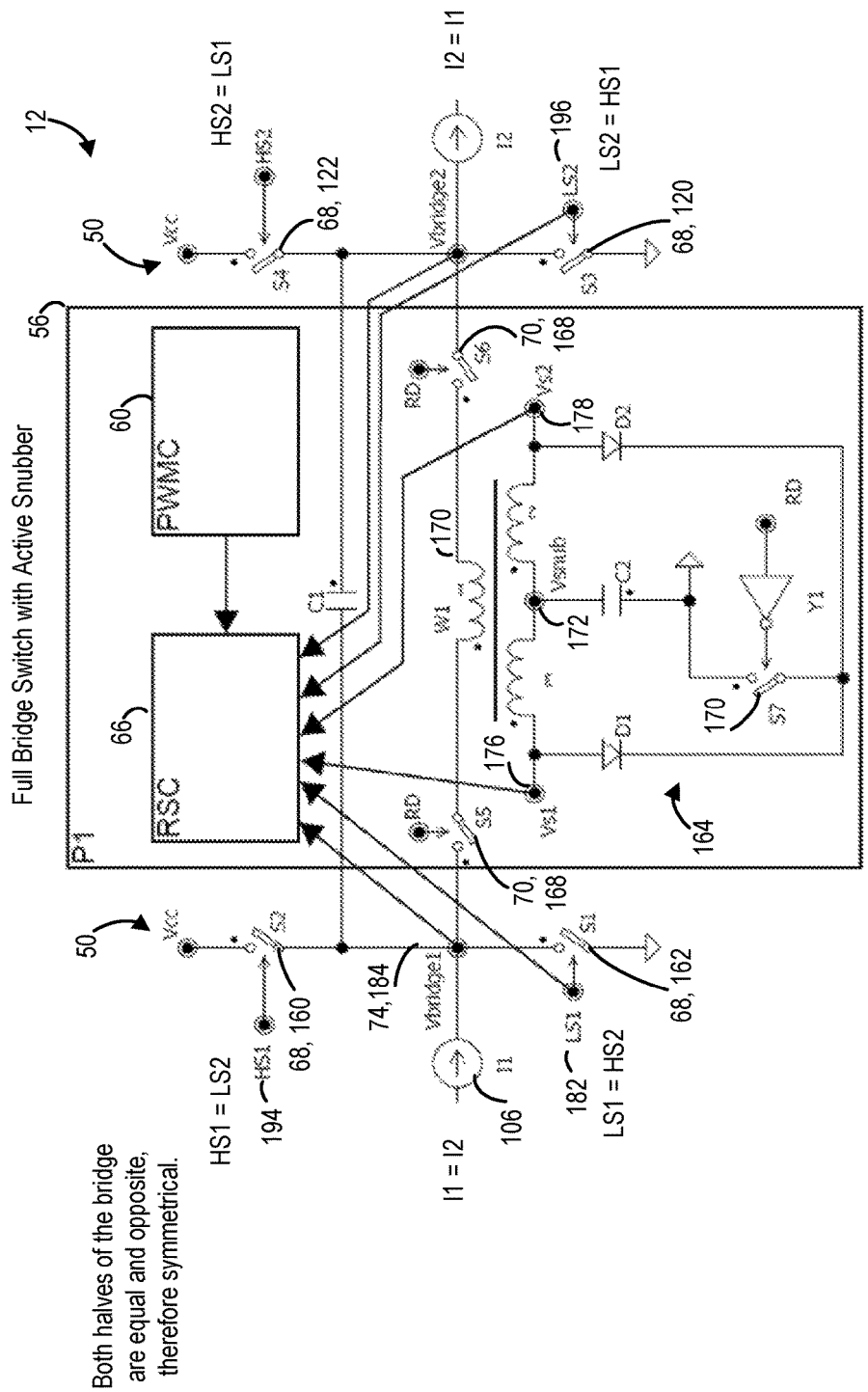
FIG. 5 is an annotated and simplified switch-level electrical schematic diagram showing in greater detail the inverter of FIG. 1 including snubber circuitry.

In response to the switch-activation signals, inverter 12 of FIG. 1 switches up to 1 MHz at 450 VDC input signal to produce a 2 KW, 240 VAC 60 Hz output signal. It also maintains a very low EMI profile due to several design features. For example, the Continuous Sigma amplifier generates the PWM encoder carrier signal that modulates from about 200 KHz up to 1 MHz, which spreads the spectrum. And the ZVS control and feedback, as shown in FIGS. 1 and 5, further minimizes EMI due to a lack of hard switching in a main power bridge and due to varying transition edge frequencies (see, e.g., transitional regions of Vbridge1 of FIG. 6 having edges of different gradients that further reduce rising- and falling-edge noise).

Due to an incredibly dense inverter section, DC 120 Hz ripple reduction is achieved with four relatively large (6.9 cubic inches consumed) 390 µF Ecaps 14. An ecap's aluminum exterior surfaces also double as a heat sink for the power module, as described in the later paragraphs, such that no additional heatsinking need be employed.

For miniaturization of components in DC-AC conversion, Indice's PSS increases the maximum frequency at which a given switch technology can be cycled, for a given power loss. This means that an IGBT can be switched at over 100 KHz, SiC or GaN devices can switch at over 1 MHz—even at up to the voltage rating of the part in many cases. By switching at these frequencies, without the normal intolerable losses, and without the ultra-fast edges caused by hard switching, embodiments of the present disclosure include a very small and simple EMI section—even for 2,000 watts of continuous output power.

By maintaining inverter input voltage 80 (FIG. 1) at or below 450 VDC, inverter 12 could operate at frequencies up to 1 MHz, meaning that output filter 16 could be reduced in size substantially while still achieving efficiencies exceeding 97.5% (see e.g., Table 1). Thus, inverter 12 electrical circuitry assembly (including output filter 16) consumes less than six cubic inches of volume, according to one embodiment. This small size leaves plenty of excess volume, such that relatively large Ecaps 14 may be used for a DC input current and voltage filter, in which case the bulk capacitors still use under seven cubic inches (specifically, 6.9 cubic inches). The remaining volume of the design is consumed by housing and two high RPM cooling fans, resulting in a compact, cube-shaped form factor of 15.68 cubic inches. The power density achieved, therefore, is 128 watts per cubic inch (2 KW/15.6 cubic inches).

As noted previously, switching 450 volts at 1 MHz is achieved with inverter 12 by deploying the switch signals timed according to signal condition and control algorithms, which are digitally implemented in RSC 66, according to some embodiments. In contrast to conventional soft-switching designs that attempt to mitigate effects of parasitics, RSC 66 embraces parasitics in the system and uses them to its advantage. To push switching speeds even faster, Indice obtained from Cree Inc. resonant drive MOSFETs 70 (included in P1 56, e.g., S5 and S6 of FIG. 5) after discovering that standard packaging (TO-247) became too lossy at frequencies over 100 KHz. RSC 66 MOSFET channels, therefore, accommodate switching frequencies over 5 MHz, which means their corresponding gates are being driven at over 50 MHz. This is so because when main power bridge 50 operates at 1 MHz, resonant MOSFETs 70 turn on for the briefest of times at the transition of the voltage of main bridge 74. This means that they are on for a fraction of the 1 MHz. Accordingly, they operate at speeds such as, for example, 5 MHz. And if the resonant drive MOSFETs 70 are on in saturation mode, then their gate voltages are at drive voltage, up from zero volts, for 90% of the 5 MHz such that the gate drive of the resonant voltage is about 10 times the switch signal frequency of 5 MHz, which is 50 MHz.

With respect to thermal management, circuit 10 may produce 2,000 watts of output power, while losing about 50 watts—similar to heat produced by a birthday candle. This level of heat, even in Indice's small cube shaped inverter housing design, is readily mitigated by strategic arrangement of components. For example, the present design takes advantage of Ecap's 14 large aluminum surface areas by having main power PCB rest atop and dissipate heat to flat metal ends of capacitors 14. The PCB itself is a three ounce, 0.8 mm highly via studded construction, which readily conducts 35 watts (maximum) of heat from the PCB to Ecaps 14 that then dissipate the heat through forced air convection provided by two high RPM DC fans, and through an outer metal case of the housing. The highest temperature device is actually RM12 main filter 18, the construction of which was achieved by creating a custom bobbin designed to minimize fringing losses caused by the high frequency, high current ripple.

Besides the power savings of RSC 66, there are advantages with respect to electromagnetic compliance (EMC). Firstly, because bridges 50 are not hard switching, the edge speed of the 450 V transition is much lower. Secondly the edge speed changes with load. Third, Continuous Sigma varies PWM frequency with output voltage, varying from 200 KHz to 1 MHz over output voltage range. This means that there is broadband frequency smearing, but without the normal hard-switching higher harmonics. This all results in minimal EMC considerations, as illustrated in the simplified schematic of FIG. 1.

Half Bridge Switch to Mid-Rail Example

Figure 2:
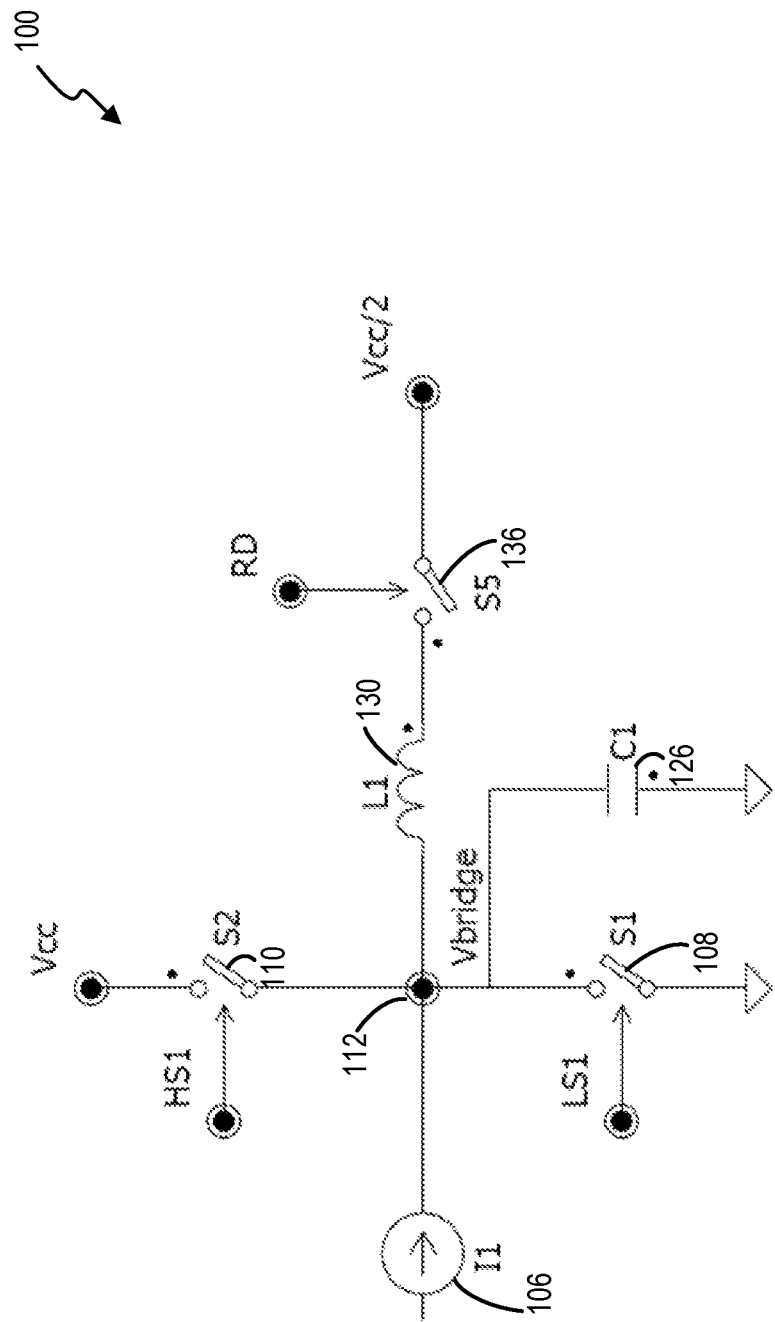
FIG. 2 is a simplified switch-level electrical schematic diagram showing a half bridge to a mid-rail circuit.

FIG. 2 shows a half bridge switch to mid-rail circuit 100. In the most basic representation of a soft-switching application, a current I1 106 is being switched between ground and Vcc via a pair of generic switches S1 108 and S2 110. Initially, current I1 106 is flowing into a switching node Vbridge 112, but it could flow in the opposite direction, in which case the set of state transitions described in the following paragraphs would operate in complete, symmetrical reverse (assuming that the current magnitude is equal but opposite). Note also that in each of the following diagrams, I1 is the current going into switching node Vbridge 112 and S1 108 and S2 110 represent one half bridge. (As an aside, S3 120 and S4 122 will represent another half bridge of FIG. 5).

In an initial state, S1 108 is short (on) and S2 110 is open (off). In traditional hard-switching implementations, a rudimentary attempt may be made to coordinate S1 108 turning off and S2 110 turning on. Generally, there is a deadtime (DT, see e.g., t0 of FIG. 6) between the state transition, which is used to ensure that both switches are never completely on at the same time. Without DT, shoot through, which is effectively a short circuit condition between Vcc and ground, results. Note that particularly slow switching devices such as IGBTs and BJTs, which both suffer from tail currents when operating in saturation mode, are sometimes implemented with some overlap. This results in excessive currents to contend with.

To ensure soft switching, a capacitor C1 126 is provided between Vbridge 112 and any other node. This means that an AC analysis of Vbridge sees C1 126 (i.e. it can be Vbridge to ground, Vcc, or Vcc/2 as all are current shorts due to ideal voltage sources). For this example, we will use Vbridge to Vcc/2, where Vcc/2 is half Vcc.

By providing C1 126, so long as its capacitance value is sufficiently large so that as S1 108 turns off, I1 106 is unable to substantially raise V(C1) until I(S1) is zero, then S1 108 has a ZVS opportunity. Voltage at Vbridge 112 will rise once S1 108 is off with equation V=I*t/C (see e.g., the rising edge of Vbridge1 in FIG. 6), where t is time, and assuming I is roughly constant during the rising edge transition. S2 110 is held off until Vbridge 112 reaches Vcc, at which point S2 112 switches on with ZVS (i.e., free of switching losses). This completes the transition of the state of the switching node 112 and is referred to as a self-resonant transition of a SMPS cycle because current at switching node 112 is already flowing in a desired direction such that, when switching devices change their switch state, the devices simply allow the state of switching node 112 to change without employing additional circuitry that would otherwise (e.g., during a forced-resonant transition of the SMPS cycle) change the direction of the flow of current.

RSC 66 controls switches when actuation signals are applied to 108 and 110 so as to adjust the DT and ensure that S2 110 switches on as Vbridge 112 approaches Vcc. Accordingly, the transition from S1 108 turning on (S2 110 off) to S2 110 turning on (S1 108 off) is made by using ZVS and with node capacitance C1 126.

Note that C1 126 need not be a discrete electrical component because the parasitics of circuit 100 and the like provide the expected capacitance at switching nodes. In fact, in the case of MOSFETs, or even lower quality ceramic capacitors, the capacitance amount is roughly inversely proportional to voltage across it. This behavior is beneficial as maximum capacitance at zero volts produces the desired effect of ZVS during turn off, but minimal capacitance at Vcc means minimal capacitance energy, which is important in the other forced-resonant transition described as follows.

When RSC 66 seeks to transition from S2 110 on (S1 108 off) to S1 108 on (S2 110 off) during the forced-resonant transition of the SMPS cycle, the direction of current flowing into switching node 112 is manipulated by a resonant section so that the current flows in an opposite direction at the conclusion of the transition. Accordingly, there are additional considerations for the forced-resonant transition.

S2 110 has current moving up through it from switching node 112 to Vcc, so turning off S2 110 before S1 108 is turned on will result in current source I1 106 feeding effectively infinite impedance at Vbridge 112, and therefore try to produce infinite volts. With additional (or system parasitic) capacitance 126, Vbridge will become Vcc+I*t/C, where t is the DT. If S2 110 is a MOSFET or similar device, it will have a body diode that will then conduct, limiting Vbridge to Vcc+Vdiode. Body diode conduction is another major source of loss during switching conditions, as explained in a variety of literature.

Once S2 110 is off, S1 108 is then turned on after DT. Note that S1 108 turns on with at least Vcc across it. Even if S1 108 could turn on virtually instantly, it would be forced to dump energy in C1 126, at the very least. If this were possible, then the instant energy loss would be $E=0.5*C*V^2$, assuming C is constant over V (hence the advantage of nonlinear capacitance mentioned previously). Practically speaking, the transition time in S1 108 will mean that there is additional power loss as S1 108 has voltage across it and current through it—the longer the transition time, the greater the loss. Besides energy loss, other problems include EMI, where the speed of the transition loss, the capacitance energy dump and the frequency with which the system changes state all contribute. This can make EMI countermeasures complex and onerous.

Figure 6:
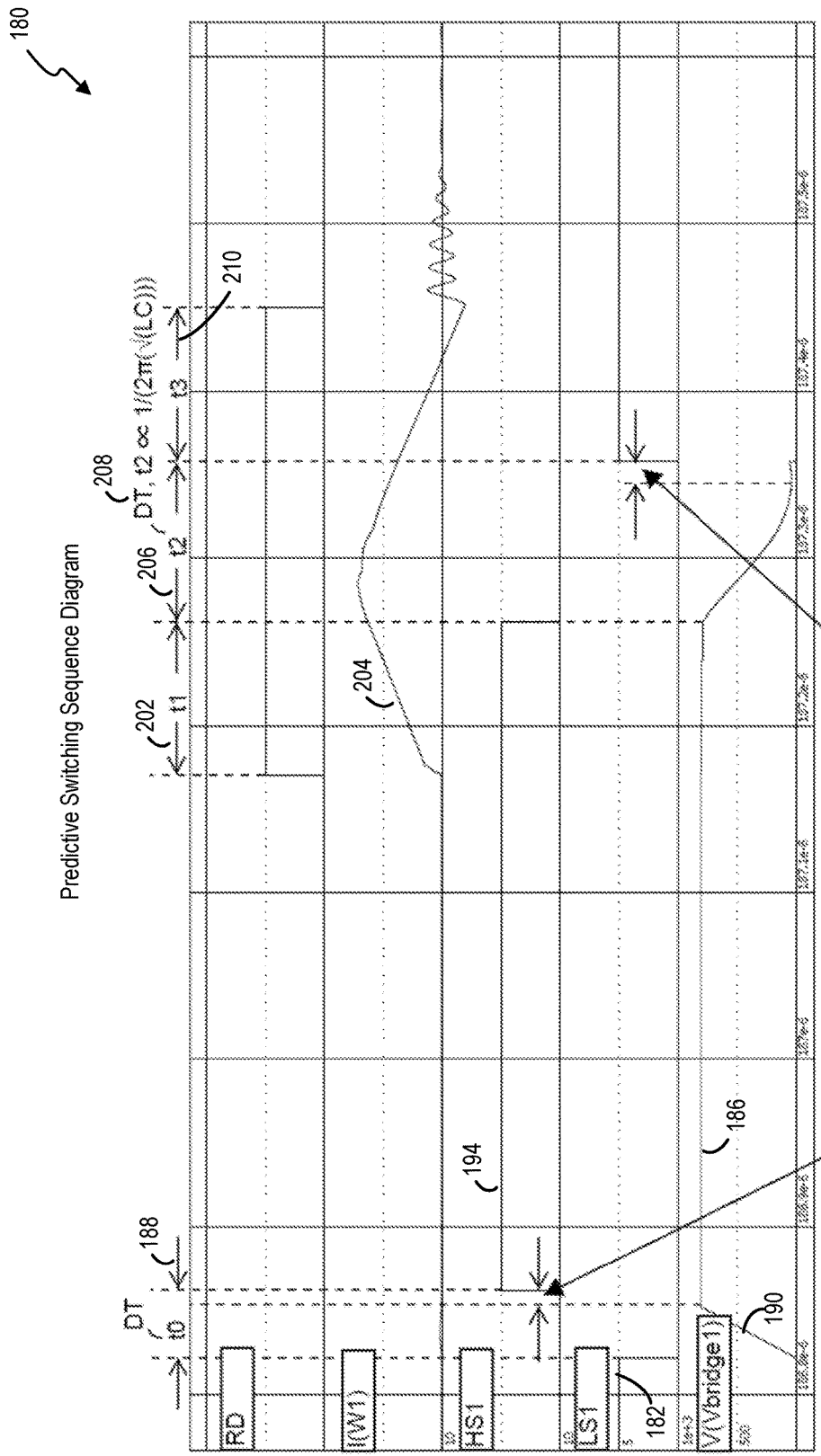
FIG. 6 is an annotated timing diagram showing a sequence of pulses controlling a switching-node voltage and current in the inverter of FIG. 5.

By revisiting the state transition (from S2 110 on to S1 108 on), but with the addition of L1 130 and resonant switch S5 136, forced resonance provides a way to dramatically lower losses (see e.g., t2 of FIG. 6). With this enhancement, before S2 108 is turned off, S5 136 is turned on. This means that L1 130 will start to charge at I=V*t/L assuming that V (voltage across L1 130) is constant during time t. When current I through L1 130 is equal to I1 106, there will be no current through S2 110, and so turning S2 110 off at this point will result in ZCS, and no sudden change in voltage at Vbridge 112. With S5 136 still on, current in L1 130 will continue to increase and surpass I1 106 until V(Vbridge)=Vcc/2, at which point V(Vbridge) will start to fall. The voltage drop at Vbridge 112 will have a cosine shape as it is a resonant system of C1 126 and L1 130, and the peak current in L1 130 will appear sinusoidal for the same reason. The frequency of the resonant transition is $1/(2\pi*Sqrt(CL))$, which is much slower than the hard-switching equivalent, and so it is much better for EMI. Eventually, V(Vbridge) falls to ground, at which point S1 108 can be turned on with both ZVS and ZCS. S5 136 is then held on until the current in L1 130 reaches zero, then turns off, with current falling at I=V*t/L, where V again is the voltage across L1 130. This soft-switching process effectively returns energy that would have been lost during hard switching to Vcc/2, and it inhibits EMI.

RSC

A goal of RSC 66 is to intelligently manage a change of a switching node's (e.g., a bridge's midpoint) state from low to high or high to low in response to PWMC 60. The PWMC 60, which can be any other type of pulse encoder or other input, simply dictates when the change in a switching-node state is desired. Accordingly, RSC 66 controls the relative timing of changes in the state of each switch associated with the switching node, such as power switches (or resonant switches, if present), to achieve soft switching in response to the PWMC's input signals.

As noted in the previous example, when the PWM input indicates a transition from S1 108 turning on (S2 110 off) to S2 110 turning on (S1 108 off), the first self-resonant transition procedure described previously is performed. Current is already flowing to ground through S1 108, so turning it off will naturally allow V(Vbridge) to climb. RSC 66, however, still determines how to set the DT so that when S2 110 turns on, V(Vbridge) is equal to Vcc.

If no sensing (feedback) delay existed in connection with sensing V(Vbridge) reaching Vcc, and if there were no switching delay in turning S2 110 on, RSC 66 could act instantly on changes immediately sensed at Vbridge 112. In reality, however, there are always delays in both the sensing of V(Vbridge) and also in a response that seeks to change the physical state of S2 110. In other words, instantaneous control is impossible, and single-cycle control is impractical. Although it may be possible to develop techniques that greatly reduce these delays, designers may wish to use these improvements to further increase operating frequency.

By assuming that I1 106 does not change significantly between successive cycles, that L1 130 and C1 126 are unchanged, and that Vcc and Vcc/2 are either unchanged or known, then RSC 66 can employ the previous cycle's timing and data (i.e., detected timing errors) for improving performance during the current cycle. For example, the previously described DT (t0, see e.g., FIG. 6) could have been recorded by RSC 66. In other words, RSC 66 might sense during a previous cycle that V(Vbridge) was not at Vcc before S2 110 was turned on. RSC 66 could detect this by examining values of voltages at Vbridge 112 and at a gate of S2 110 to observe V(Vbridge) at the moment before the sensed gate voltage of S2 110 had indicated that S2 110 made its state transition. RSC 66 monitors a voltage that is applied directly to the gate pin of a MOSFET because it is more direct than monitoring a signal controlling a gate driver, which introduces a propagation delay to the gate voltage signal.

If S2 110 was detected as being switched on before V(Vbridge) had reached Vcc, then RSC 66 recognizes that there has been a hard-switching event, and that the DT (t0) for the subsequent cycle should be increased. Likewise, if V(Vbridge) had reached Vcc long before S2 110 turned on, then RSC 66 will reduce the DT (t0) for the subsequent cycle to avoid body diode conduction losses. The adjustment may be made to the time at which RSC 66 signals S2 110 to transition its state, but other switch-actuation parameters may be adjusted in other embodiments.

A DT adjustment, according to one embodiment, is made by RSC 66 incrementing its recorded state transition times by one or more clock cycles in a direction away from the relative timing of the error. For example, RSC 66 may adjust its switch-actuation timing by one clock-period in a direction that reduces the error for a subsequent PWM controller cycle. This one-clock-period adjustment is typically acceptable provided that I1 106 varies little from one cycle to the next. If it moves faster, then the magnitude of the adjustment or a multi-order error adjustment system may be employed. In other words, if the rate of change of I1 (or Vcc) is small compared to the switching speed, minor—perhaps incremental—adjustments are made to adjust the switch timing. But if the system changes more vigorously, then more complex error-correction systems can be employed, such as first or second order control schemes.

With reference again to the forced-resonant switching sequence described in the previous example, a PWM input next indicates a change from S2 110 on (S1 108 off) to S1 108 on (S2 110 off), is desired. Where L1 130 is employed, via S5 136, to pull V(Vbridge) to ground, the previously described technique may be used for soft switching. For example, RSC 66 recognizes that S1 108 is to be turned on, due to a PWM state change. Then, S5 136 is turned on for an amount of time based on the previous S1 108 turn-on transition, as modified by a previously detected timing error. The timing error is detected as follows.

If, during the previous cycle, V(Vbridge) was not at or near ground the moment that S1 108 was detected to turn on (e.g., observed by monitoring its gate pin voltage), then RSC 66 recognizes that there was a hard switch for that cycle. RSC 66 then increases the charge time for L1 130 (see e.g., t1 of FIG. 6) so that V(Vbridge) will hit ground coincident with the turn-on-time of S1 108. Similarly, if V(Vbridge) hit ground moments before S1 108 was detected to turn on, then the charge time (t1) should be reduced. S5 136 is then turned off once current through L1 130 reaches zero.

There are a number of other subtleties in this latter, so-called forced-resonant transition. First, when S5 136 is turned on while S2 110 is on, the current in L1 130 is I=V*t/L, where V is Vcc −Vcc/2, i.e., the voltage across L1 130. This current, therefore, is a linear ramp. When current in L1 130 equals I1 106, S2 110 turns off. The current in L1 130 then continues to increase beyond that point, but now the shape will be sinusoidal, with a frequency of 1/(2π*Sqrt (C*L)). This is important as it indicates that the resonant transition frequency has nothing to do with the load current or Vcc—it is purely a resonant function of L1 130 and the capacitance of switching node 112. The resulting current waveform is a triangle with a rounded (sine) peak. The time t1, therefore, still indicates the current I1 106, and t1 is a parameter that is tuned by RSC 66 in this instance, as we assume the discharge time (after V(Vbridge) has reached ground, but before current in L1 130 reaches zero) is also equal to t1.

Half Bridge Resonant Capacitors Example

Figure 3:
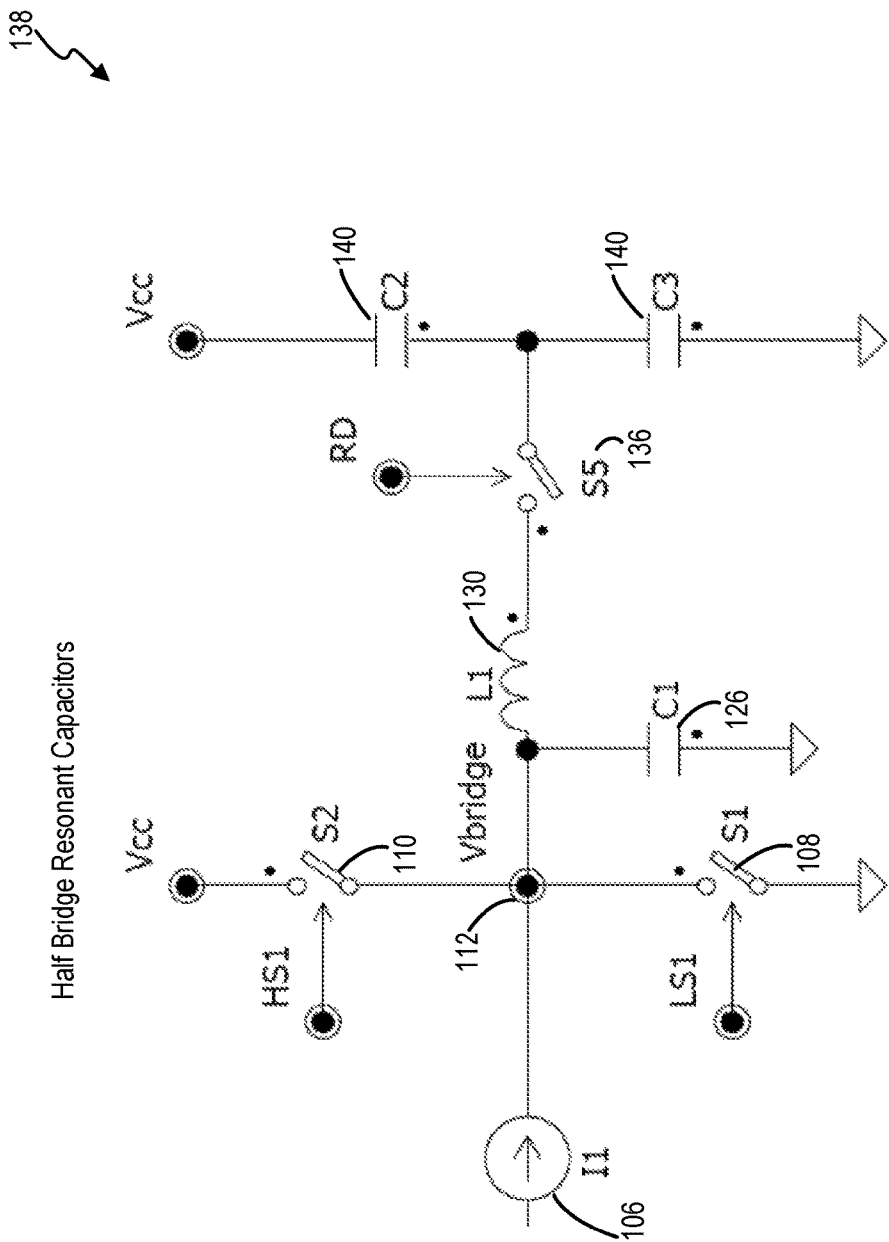
FIG. 3 is a simplified switch-level electrical schematic diagram showing a split capacitor mid-rail circuit.

With reference to FIG. 3, a more detailed circuit is shown with voltage-divider capacitors 140 in lieu of Vcc/2. A pair of identical capacitors 140, considerably larger than C1 126, are joined at S5 136, and provide a virtual Vcc/2. This assumption holds true so long as the average current through L1 130 is zero relative to the size of capacitors 140, otherwise eventually the midpoint voltage of the capacitors will no longer be Vcc/2—an imbalance causing error in inductor charge times.

Half Bridge Switch to Rail Example

Figure 4:
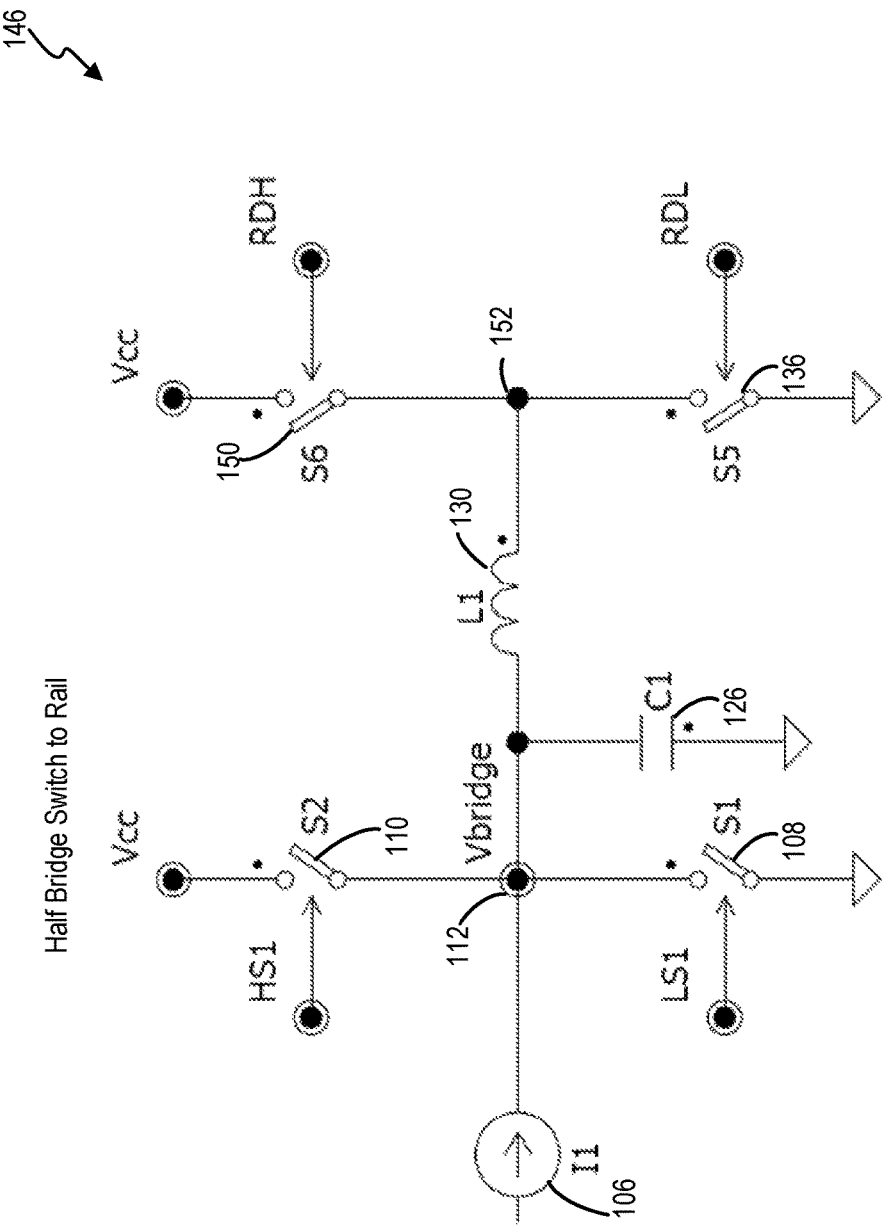
FIG. 4 is a simplified switch-level electrical schematic diagram showing an additional half bridge for switching to Vcc or ground.

FIG. 4 shows another half-bridge circuit 146 where S5 136 and a new S6 150 allow a node 152 opposite Vbridge 112 to be joined to either ground or Vcc. This has a number of additional advantages. First, there is no issue with rail stability. Second, if both S5 136 and S6 150 have a diode, either internal or added across them, both pointing from lower voltage to higher voltage, then there can never be an issue of L1 130 being turned off with current through it (causing excessive back EMF). Excessive back EMF is avoided because there is always a return path to either Vcc or ground, depending on which direction the current is flowing.

Examining the PSS cycle (self- and forced-resonant transitions) again, when the PWM signals a state change, we assume that both S5 136 and S6 150 are off. As we wish to pull V(Vbridge) to ground, we charge L1 130 by turning on S5 136 with S2 110 on. L1 130 charges (as before) until its current equals I1 106. V(Vbridge) falls (as before) until reaching ground, when S1 108 is turned on, but in this example S5 136 is turned off and S6 150 is turned on, allowing L1 130 to discharge. In the case where I1 is always going only one direction, S6 150 may be a diode (see e.g. D3 of FIG. 13) or one-way passive switch as with a normal booster. If, however, I1 106 is bidirectional, then S6 150 may be used to turn on to pull V(Vbridge) up to Vcc in the opposite scheme. Either way, S6 150 should turn off when L1 130 current reaches zero. Again this is practically impossible, either S6 150 will turn off early and its body diode will commutate until L1 130 discharges, but then reverse recovery will charge L1 130 the reverse direction, or it will turn off after the current in L1 130 changes direction. Either way, the diode in S5 150 will conduct as L1 130 conducts current towards S1 108. This current will then either discharge due to losses, or remain circulating until the next change in state. Alternatively, S5 136 can remain on until the next state change, reducing the loss of current in L1 130 and therefore raising efficiency.

Full Bridge Including Resonate Drive System

FIG. 5 shows full bridge 50, where the two half bridges are assumed equal and opposite. This affords a number of additional advantages. First, S2 160 and S4 122 (high side) switches are each assumed to be on at the same time as their diagonally opposite low-side switch, i.e., S1 162 and S4 122 form a pair, and S2 160 and S3 120 form a pair. Therefore, RSC 66 may be operatively coupled to low-side switches and avoid high voltages of high-side switches. An active snubber 164 is also provided.

S5 166 and S6 168 are turned on simultaneously for charging transformer W1 170, which is similar to inductor L1 130 of previous examples, but includes switch-activated secondary windings that control back-EMF. Recall that in previous embodiments, if S5 136 was turned off with any current through L1 130, back-EMF issues arose. In FIG. 5 too, the same situation could exist in the absence of the secondary windings that are switched via S7 170 to absorb the excess EMF. Timely switching S7 170, however, effectively clamps the primary winding of W1 170 in response to S5 166 and S6 168 being off. This means that any excess energy in W1 170 is clamped to Vsnub 172, rather than being destructive or just lost. Vsnub 172 may be either dissipated, or used to drive other electronics, thus raising the system efficiency. While this is advantageous, it is still desirable to switch S5 166 and S6 168 off and S7 170 on at as close to zero W1 170 current as possible. Signals received from Vs1 176 and Vs2 178 nodes provide edge information that indicates which way to adjust the on-time of S5 166 and S6 168.

Also note that LS1, LS2, and similar sensing inputs of RSC 66 are all received by RSC 66 as digital values, referred to as "Events" in FIG. 7. RSC 66 uses the event timing for determining how to adjust the timing of its output control signals applied to gate drivers operatively coupled the switches. An example of circuitry used to provide digital values (i.e., hard-switching and diode-conduct events) is described with reference to FIGS. 30-32.

FIG. 6 shows a sequence diagram 180 for inverter 12. Initially, when LS1 182 is high, S1 108 is on. Then, S1 108 is turned off, LS1 182 is detected by RSC 66 as low, and voltage at Vbridge1 184, or V(Vbridge1) 186 begins to rise based on the self-resonant response. During a first DT 188 (which corresponds to t0), V(Vbridge1) climbs to Vcc from ground, at a gradient 190 corresponding to V=I*t/C. So the bigger I is for a given C, the faster V(Vbridge1) 186 will climb (the faster its rise time). Therefore, first DT 188 is adjusted depending on the magnitude of I (or the rise time of V(Vbridge1) 186. This is also how current in the system is detected without having to measure it directly—the rise time and value of switching-node capacitors may be used to derive the value of the current.

Upon expiration of DT 188, HS1 194 is set high and verified by monitoring LS2 196 (FIG. 5), which is its low-voltage counterpart.

FIG. 6 next shows that a resonant drive (RD) pulse 200, or simply resonant pulse, transitions from low to high in response to a state transition indicated by a PWM signal (not shown). RD pulse 200 includes three sections, labeled t1, t2, and t3. A first section (t1) 202 is a charging ramp that charges up W1 170 so that its current I(W1) 204 is equal to that of current I1 106 (as described previously). HS1 194 is then transitioned from high to low, shutting S2 160 off. A second section (t2) 206 is a resonant section in which a second DT 208 begins from the falling edge of V(Vbridge1) 186. A third section (t3) 210, is the discharge section after t2 in which S1 162 is turned on and LS1 182 is detected as being high. Notice that there is a slight hard switching loss between the minimum of V(Vbridge1) 186 and the rise of LS1 182. The time period causing this error is used as the basis for correcting the timing of a next forced-resonant transition for a subsequent switching cycle.

Discharge section (t3) 210 should ordinarily consume the same amount of time as that of charging section (t1) 202, but it may be adjusted by monitoring Vs1 176 and Vs2 178 to detect when I(W1) 204 reaches zero current and snubber switch 57 170 is switched on at the expiration of t3. For example, t3 210 is actually after I(W1) 204 has crossed zero. Therefore, the next t3 210 may be shortened during the subsequent cycle. Upon the expiration of t3 210, the snubber is in-circuit and absorbing energy from W1 170 so that the energy from the primary windings can be repurposed.

The following table shows efficiency improvements as a result of RSC 66 performing cycle-by-cycle PSS using a SiC MOSFET symmetrical full bridge with SiC resonant MOSFETs operating at 100 KHz.

TABLE 1

|  | Output (W) | | | | | |
| --- | --- | --- | --- | --- | --- | --- |
|  | 200 | 400 | 600 | 1000 | 1500 | 2000 |
| % of Full Power | 10% | 20% | 30% | 50% | 75% | 100% |
| Efficiency with PSS | 96.28% | 97.90% | 98.52% | 98.88% | 99% | 98.98% |
| Efficiency Without PSS | 88% | 93.50% | 95.47% | 96.86% | 97.52% | 97.62% |

Table 1 shows that PSS provides over 96% efficiency at low system power conditions and nearly 99% efficiency at full power conditions, whereas a similar topology without PSS operates less efficiently at all output conditions.

Cycle-by-Cycle PSS Topologies

FIG. 7 shows a block diagram of SMPS systems 220 with and without RSC 66. Note that RSC 66 senses events 222 which are edges detected from points (e.g., LS1, LS2, Vs1, Vs2, Vbridge1, Vbridge2, or other points) described in connection with FIG. 5. It monitors a state of a switching node and provides over-current information (i.e. faults 226) to the PWMC so as to optionally adjust the PWM signal in response to sensing there is too much current in the system. Another example of a fault is when RSC 66 has a limited window of time by which to adjust timing parameters of control output signals, but it cannot make an adjustment within that window. In other words, a fault occurs when hard switch event cannot be corrected (cannot ZVS) while satisfying system parameters (e.g., voltage, current, or time).

FIG. 8 provides an overview 238 of various topologies 240 that may employ the techniques of this disclosure. More specific example implementations and timing diagrams are provided herein. A summary of the following examples is as follows.

Figure 9:
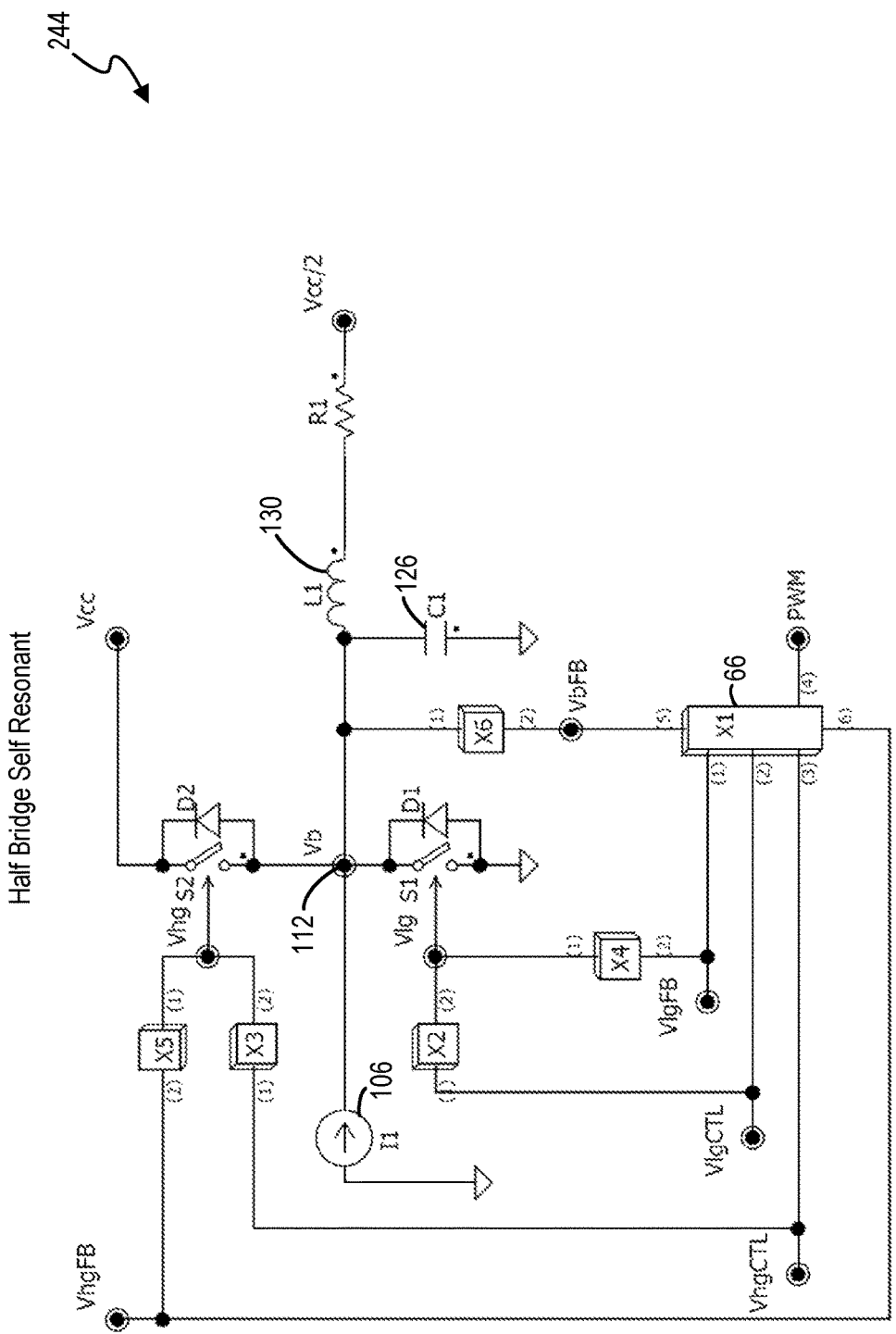
FIG. 9 is a simplified switch-level electrical schematic diagram showing a half bridge self-resonant circuit embodiment.

A self-resonant system 242, totem pole circuit 244 is provided in FIG. 9 and explained in detail below. Other example circuits of FIGS. 6, 13, 17, 21, and 26-29 include one of two types of ARCP implementations 246: full- and mid-rail commutated. For example, a booster 248 (FIG. 13) and half bridge 250 (FIG. 17) are both rail commutated. In contrast, a mid-rail commutated half bridge 252 is provided in FIG. 21.

Among full- and mid-rail types of forced-resonant systems, there are unidirectional 260 and bidirectional 262 topologies. Booster 248 is unidirectional, whereas half and full-bridges may be bidirectional, in which case the ARCP is able to ZVS Vb in both directions (current flows both directions).

Figure 26:
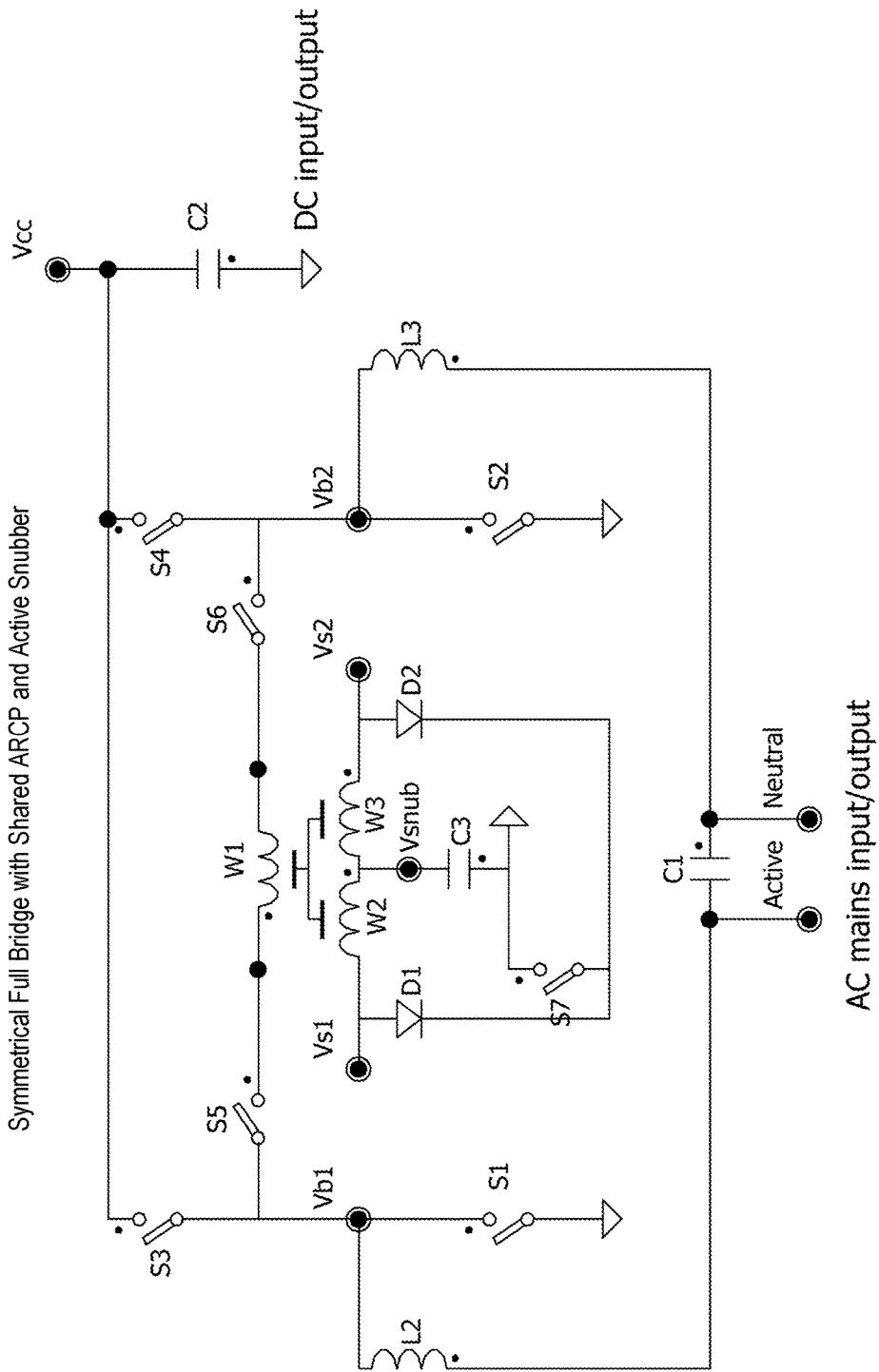
FIGS. 26 and 27 are simplified switch-level electrical schematic diagrams showing, with and without an active snubber, symmetrical full bridges with shared voltage clamped ARCP circuitry.
Figure 27:
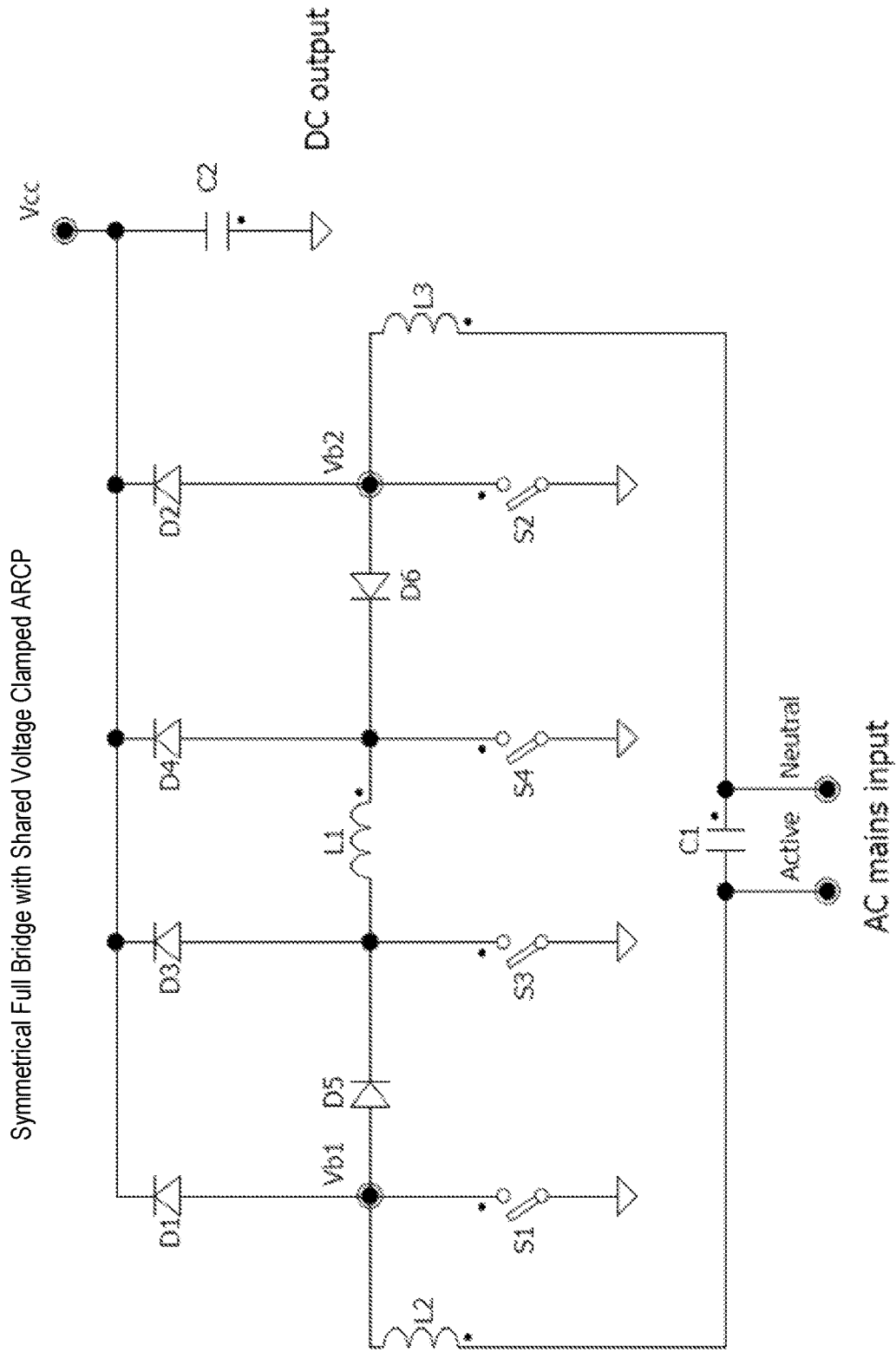

There are two sets of full bridge variations. The first set includes symmetric full bridge rail commutated ARCP, which are shown in FIGS. 6, 26, and 27. Both sides of the full bridge are equal and opposite, and therefore symmetry allows use of a single inductor and ARCP switch. This yields the waveforms of FIG. 6, which resemble those of the mid-rail half bridge (see e.g., waveforms of FIGS. 22-24). The second set includes asymmetric full bridge full- and mid-rail commutated ARCP (FIGS. 28 and 29), which operate in a manner that is similar to that of the half bridge commutated counterparts (FIGS. 17 and 21), but in two semi-independent half bridges (making a full bridge).

In the following examples, blocks labeled X1 represent RSC 66 and associated circuitry. It should be understood, however, that the RSC functionality may be implemented as a hardware circuit comprising custom very large scale integration (VLSI) circuits or gate arrays, off-the-shelf semiconductor integrated circuits such as logic chips, transistors, or other discrete components. Functions of RSC 66 may be implemented in programmable hardware devices such as FPGAs, programmable array logic, programmable logic devices, or the like. According to another embodiment, the RSC may be implemented in other types of circuitry that may refer to, be part of, or include an application specific integrated circuit (ASIC), an electronic circuit, a microprocessor (with internal or external memory) that executes one or more software or firmware program instructions, a combinational logic circuit, or other suitable hardware components that provide the described functionality. In some embodiments, RSC 66 may be implemented in, or functions associated with RSC 66 may be implemented by, one or more software or firmware modules or components. In other embodiments, RSC 66 may include logic, at least partially operable in hardware, and it may be included as a system on a chip (SOC).

Similarly, blocks labeled X2-X8 represent inherent delays and associated circuitry. For example, X2 may represent gate-driver circuitry that introduces a delay between RSC 66 output control signals and switch-actuation signals applied by a gate driver to a corresponding switch. Likewise X4, for example, may represent inherent signaling delay attributable to parasitics or isolation circuitry.

Finally, the subsequent examples use the following notation for identifying signals. Output control signals provided at outputs of RSC 66 include "CTL" in the labels. Input feedback signals monitored at inputs of RSC 66 include "FB" in the labels. Control and feedback signals are depicted in timing diagrams as digital signals, whereas other signals in timing diagrams have sloped or ramped response times to depict channel formation and other delays. Signals sensed from a switching node are identified by "b" in the label. Signals associated with changing or monitoring a state of switch (e.g., signals to or from a gate) are indicated by "g" in the label. Low-, high-, and resonant-side switching signals also include, respectively, "l," "h," and "r" in the label. For example, a low-side power-switch gate control signal from an output of RSC 66 is labeled "VlgCTL." A gate driver X2 receives that signal to generate a corresponding gate-drive signal "Vlg," which is received back at an input of RSC 66 as a "VlgFB" signal.

Self-Resonant Example

RSC 66, or other switch-timing control circuitry X1, is responsive to a pulse-width modulated (PWM) signal V(PWM), and reduces switching losses in a resonant switch-mode power supply. In this example, FIG. 9 shows half bridge self-resonant push pull circuit 244, but other self-resonant circuits (e.g., an LLC) may also be understood by this example. Because this is a self-resonant system, the cycle-by-cycle PSS control is used to adjust DT on both high-to-low and low-to-high transitions of Vb 112. In other words, this embodiment does not have a forced-resonant timing adjustment as previously shown and described in connection with t1 of FIG. 6. As an aside, self-resonant systems can benefit from more complex Vb detection, where it may be acceptable to turn on a power device with some voltage across it, or it is desired to detect a falling edge based on dV/dt rather than a zero crossing.

Figure 10:
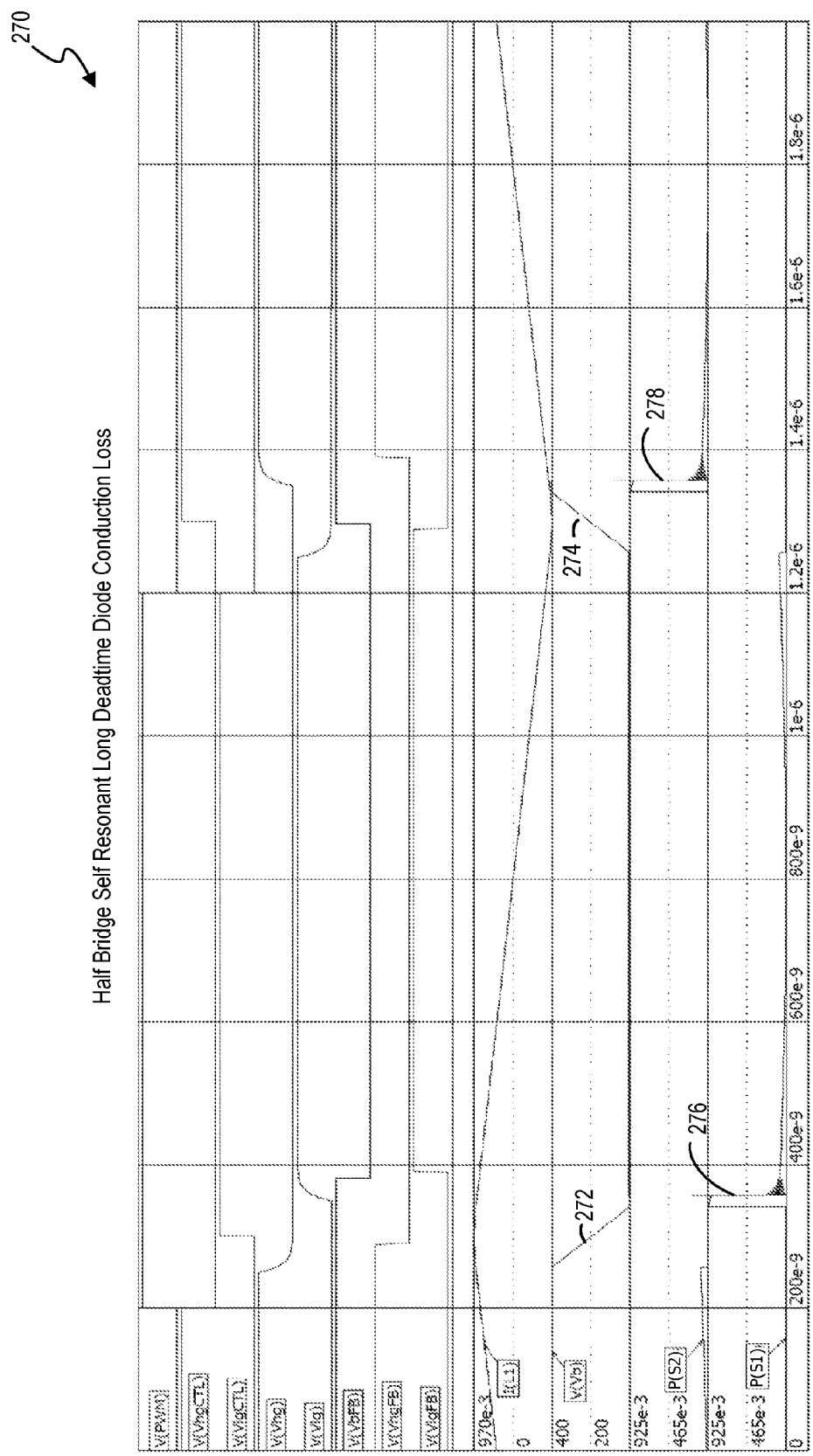
FIGS. 10, 11, and 12 are timing diagrams showing the embodiment of FIG. 9 switched according to long, short, and optimal timing parameters.
Figure 11:
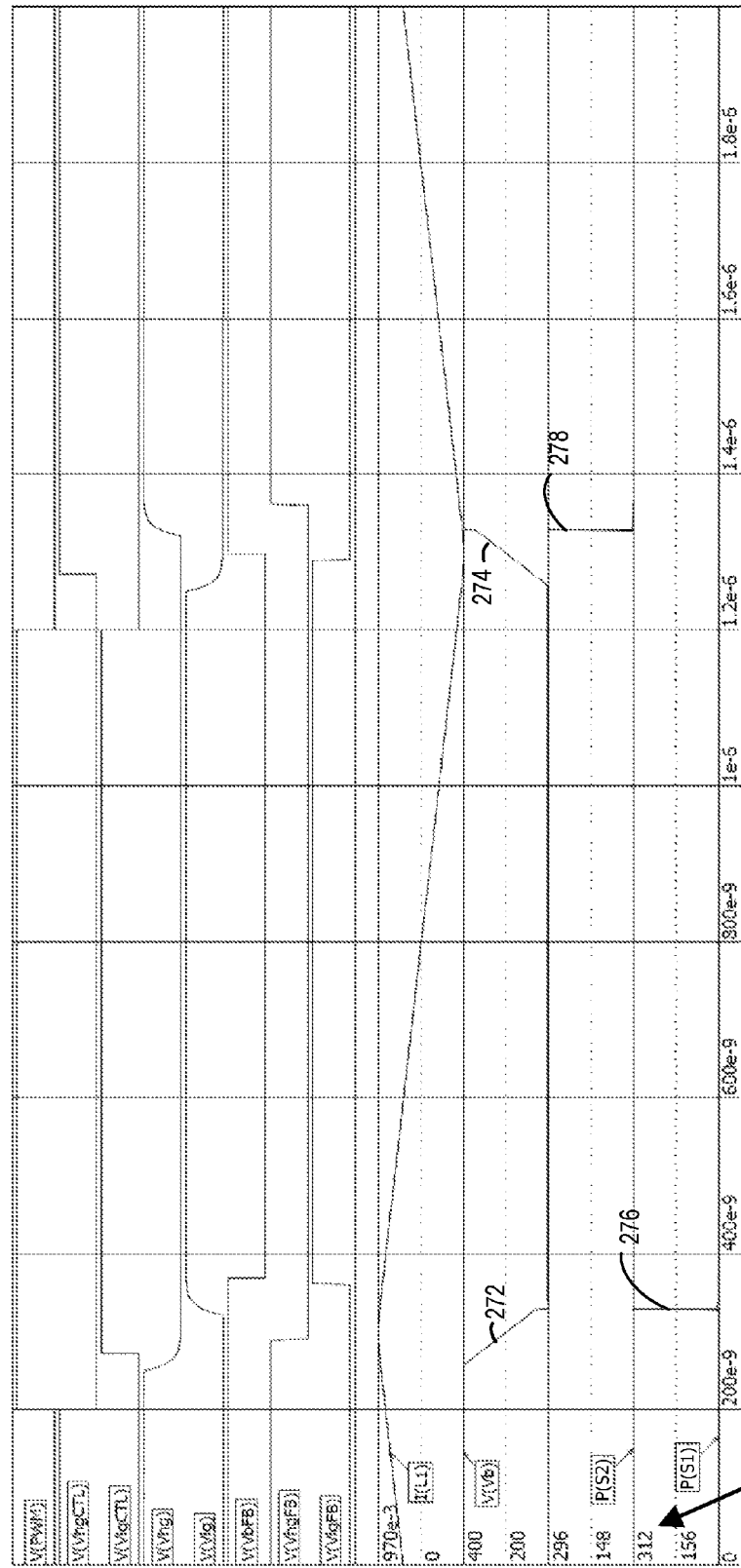
Figure 12:
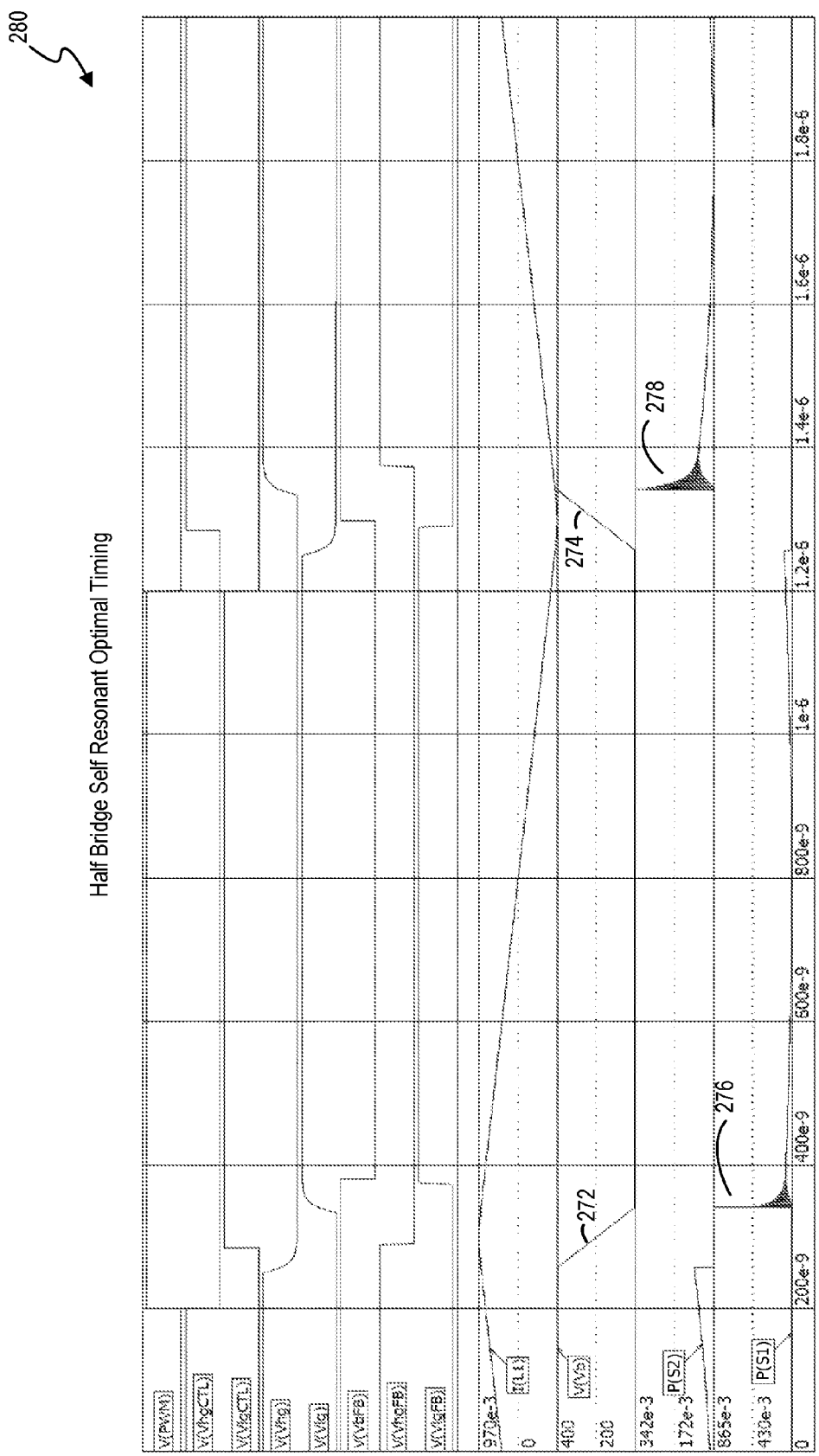

FIGS. 10-12 show timing diagrams associated with circuit 244. In a first cycle 270, first 272 and second 274 transitions are made with losses 276 and 278. This is so in FIG. 11 because the DT is too long in both instances, causing diode losses. Similarly, FIG. 11 shows effects of DT that is too brief and causes hard switching losses, which are typically much higher than those shown in FIG. 10 (note the change in the scale of the power through the switches). Finally, FIG. 12 shows ideal timing in a second cycle 280 with negligible losses resulting from RSC 66 providing switching signals to cause switching at optimal soft-switching conditions.

In a typical real-world scenario, a cycle may show some combination of body diode conduction, hard switching, or negligible losses on any one of its high-to-low or low-to-high transitions. In other words, for example, a real timing diagram might show hard-switching loss during the high-to-low transition (as in FIG. 11) and body diode conduction loss during the low-to-high transition (as in FIG. 10). Any combination of errors, however, are detectable in a first cycle and correctable in a second cycle so as to produce the ideal timing shown in FIG. 12. Accordingly, the correction made during the second cycle may entail shortening DT during a first transition of the second cycle and lengthening it during a second transition of the second cycle (or vice versa).

Booster Example

Figure 13:
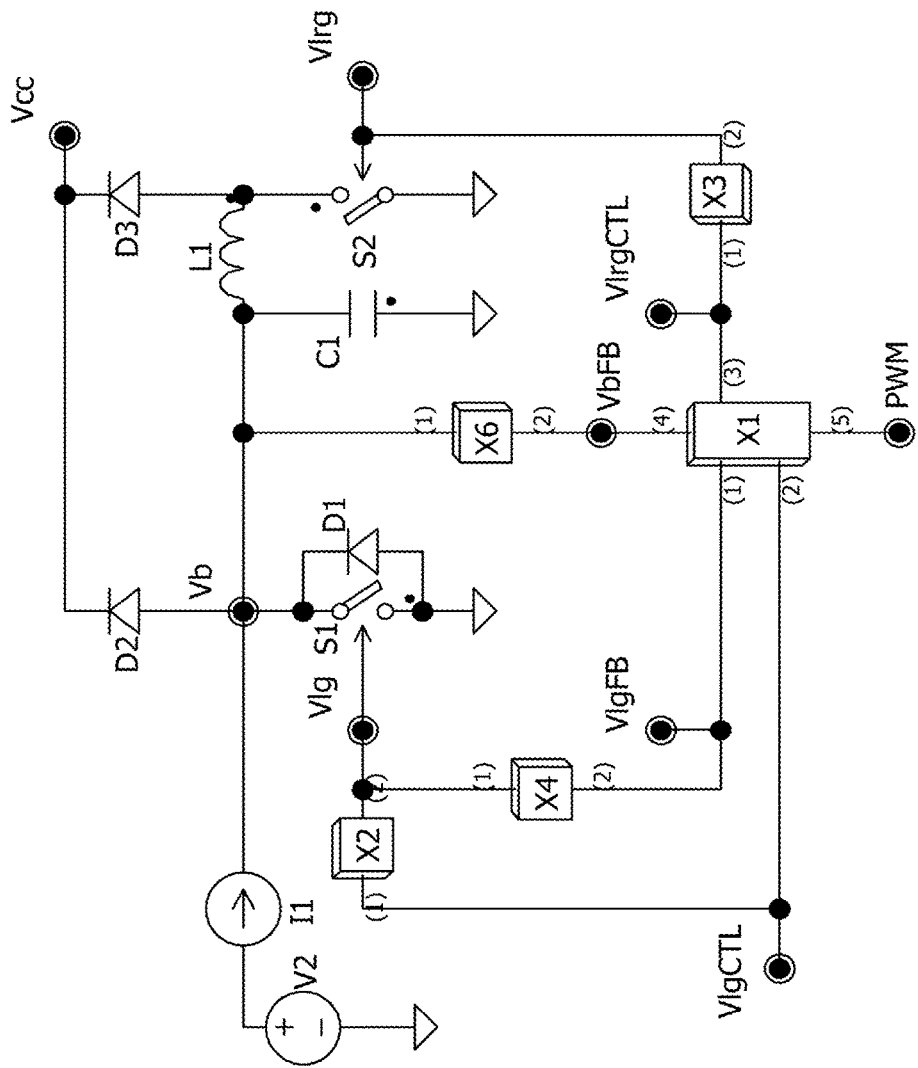
FIG. 13 is a simplified switch-level electrical schematic diagram showing a booster full-rail commutated, auxiliary resonant commutated pole (ARCP) circuit embodiment.

RSC 66, or other switch-timing control circuitry X1, is responsive to a pulse-width modulated (PWM) signal V(PWM) to reduce switching losses in a resonant switch-mode power supply, which is booster 248 in FIG. 13. Booster 248 includes a switching node Vb having a node voltage V(Vb) that is dynamically adjustable according to states of first and second switches S1 and S2. First switch S1 is responsive to a first drive pulse V(Vlg) provided by a first driver X2, and second switch S2 is responsive to a second drive pulse V(Vlrg) provided by a second driver X3.

RSC 66 includes first and second feedback inputs. The first feedback input VlgFB is operatively coupled to the first switch S1 for detecting a first time at which the first drive pulse V(Vlg) changes the first switch S1 to its on state. The second feedback input VbFB is operatively coupled to the switching node Vb for detecting a second time at which the node voltage V(Vb) is detected at a minimum value across the first switch S1.

RSC 66 also includes first and second control outputs. The first control output VlgCTL is operatively coupled to the first driver X2 to provide, in response to a timing prediction derived based on feedback detected from a previous PWM cycle, a first logic control pulse V(VlgCTL) for the first driver X2 so as to generate the first drive pulse V(Vlg) as a delayed gate-driving version of the first logic control pulse V(VlgCTL). The second control output VlrCTL is operatively coupled to the second driver X3 to provide, in response to the PWM signal, a second logic control pulse V(VlrCTL) for the second driver X3 so as to generate the second drive pulse V(Vlrg) as a delayed gate-drive version of the second logic control pulse V(VlrCTL).

RSC 66 includes logic circuitry configured to derive the timing prediction based on a difference between the first and second times detected from the previous PWM cycle such that the difference indicates, for a following PWM cycle, a timing adjustment applied to the first V(VlgCTL) or second V(VlrCTL) logic control pulses to ensure that the first V(Vlg) and second V(Vlrg) drive pulses transition the first switch S1 to its on state and the second switch S2 to its off state when the node voltage V(Vb) is at a level that reduces the switching losses.

Figure 14:
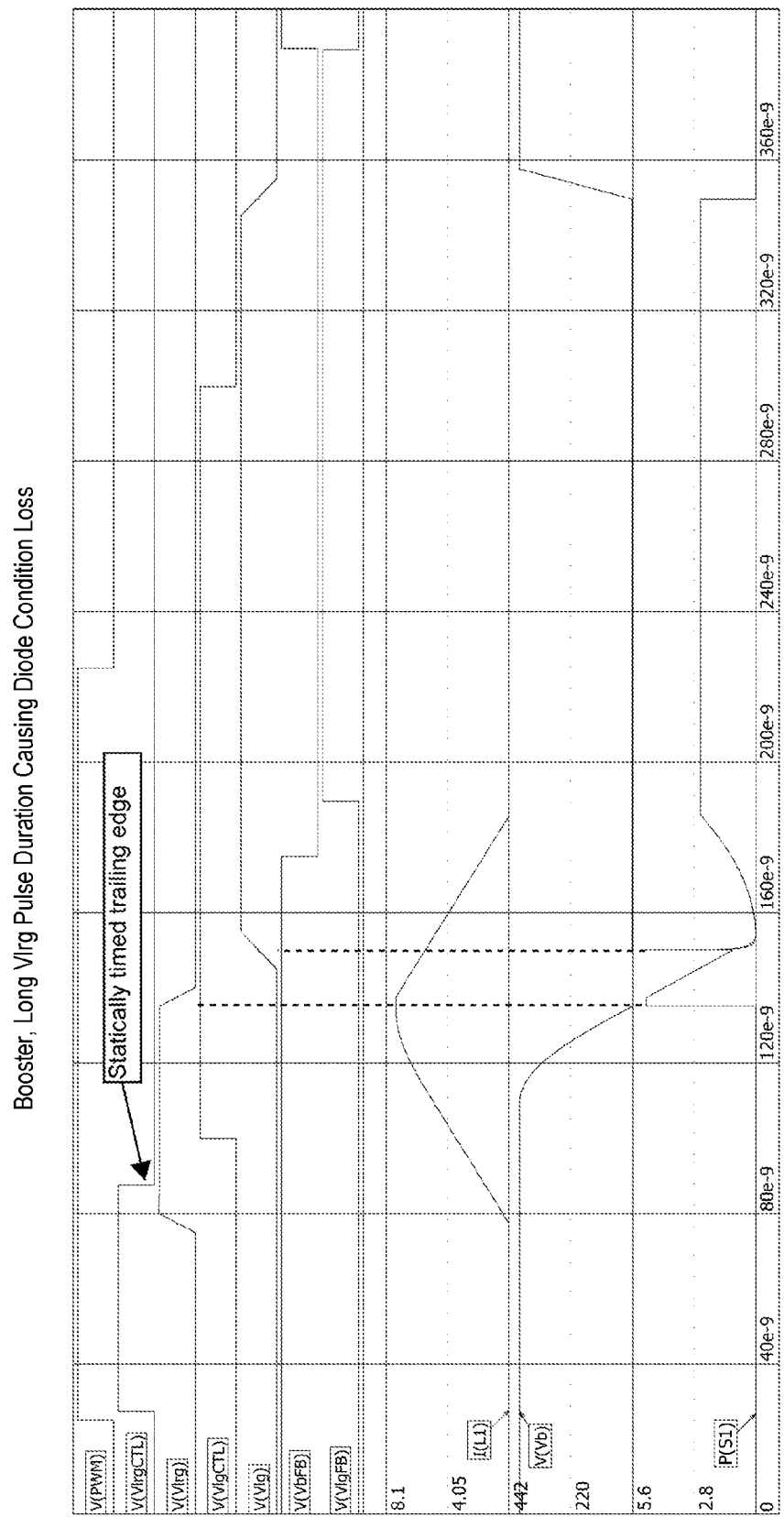
FIGS. 14, 15, and 16 are timing diagrams showing the embodiment of FIG. 13 switched according to long, short, and optimal timing parameters.
Figure 15:
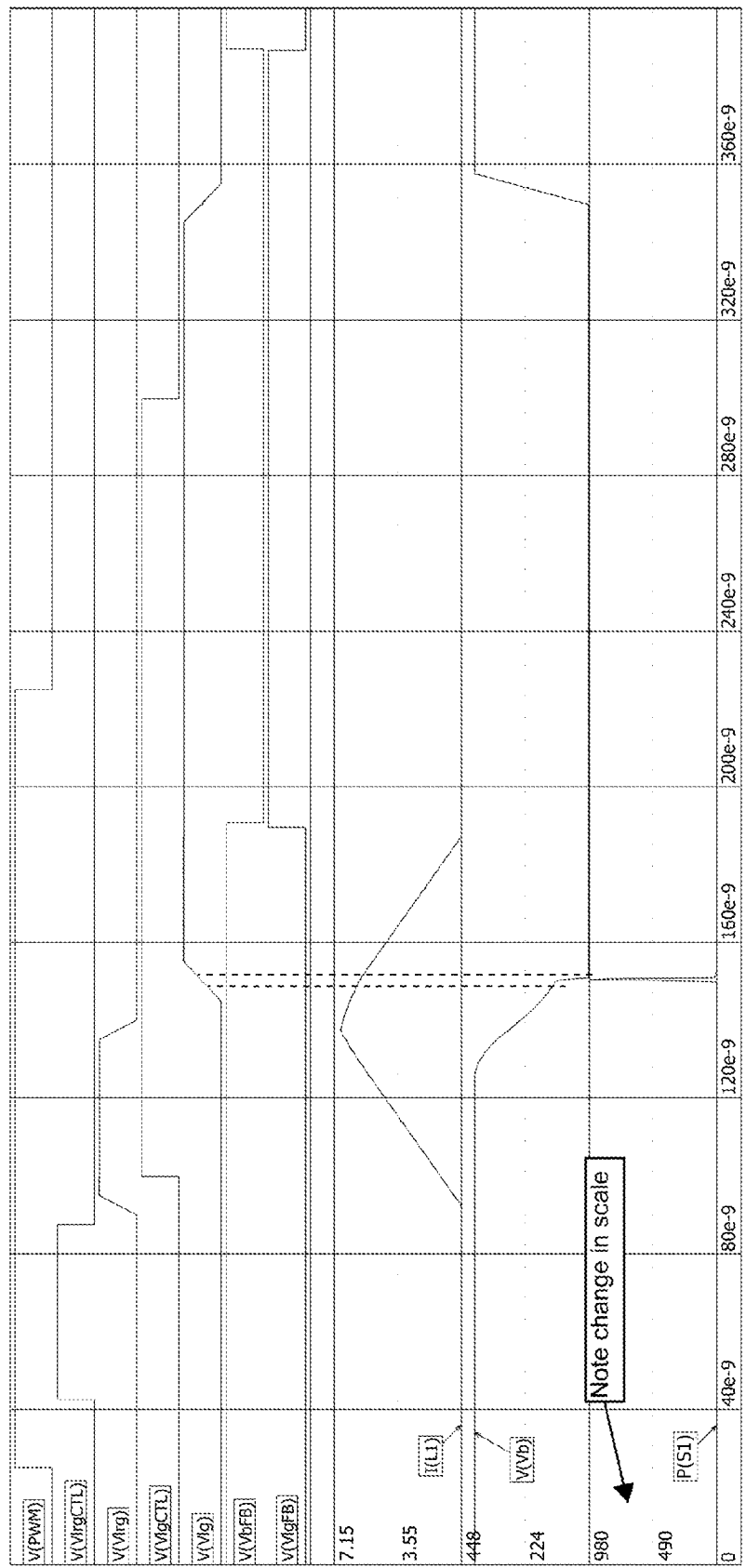
Figure 16:
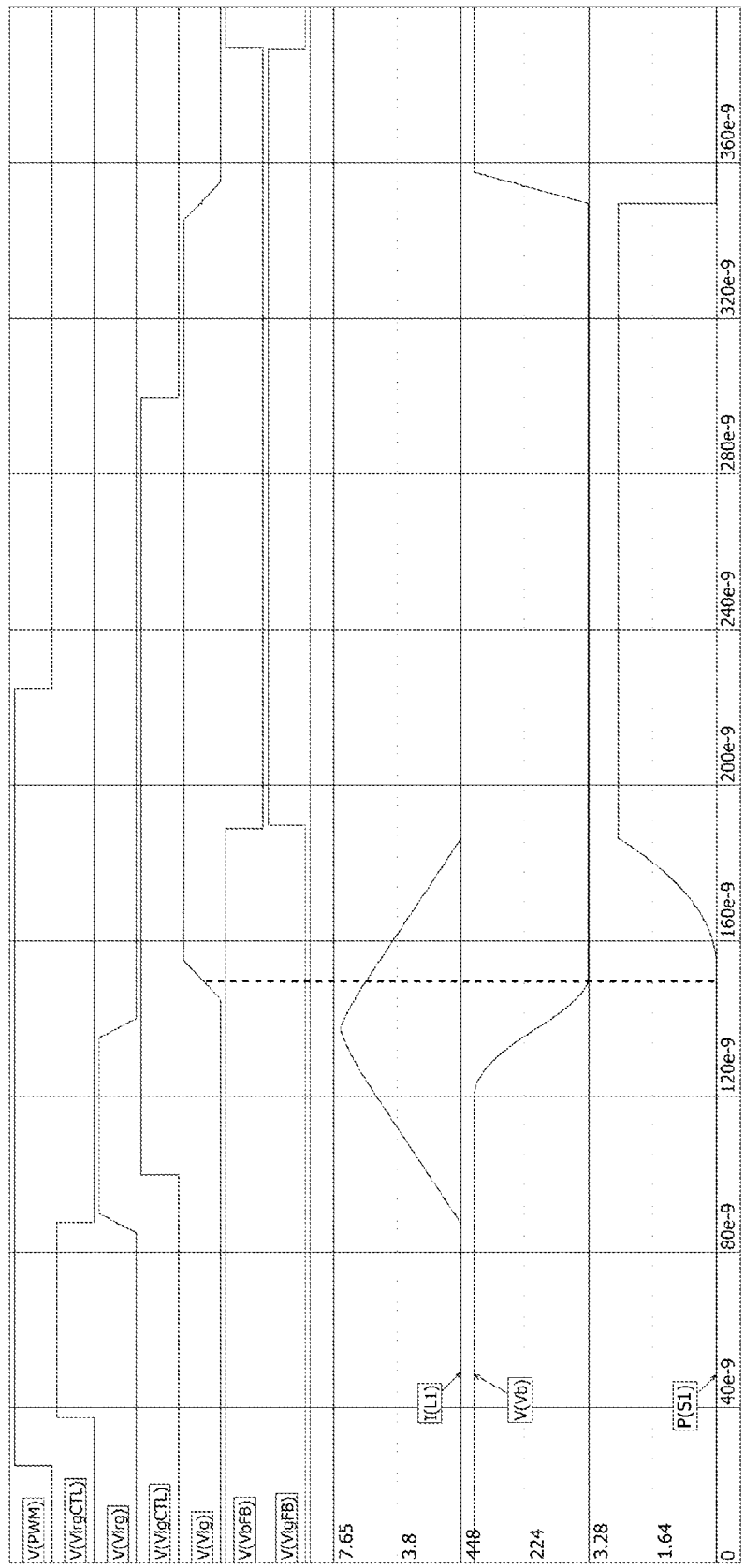

Examples of losses are provided in timing diagrams of FIGS. 14 and 15. FIG. 16 shows a following cycle in which the timing errors of FIGS. 14 and 15 are corrected by adjusting a timing parameter such as a resonant drive pulse width for the forced-resonant transition and a DT of the self-resonant transition. The first transition shown on FIGS. 14-16 is the PWM low-to-high transition—the so-called forced-resonance transition. The second PWM high-to-low transition completes the cycle in a self-resonance transition.

Half Bridge Rail Commutated, ARCP Example

Figure 17:
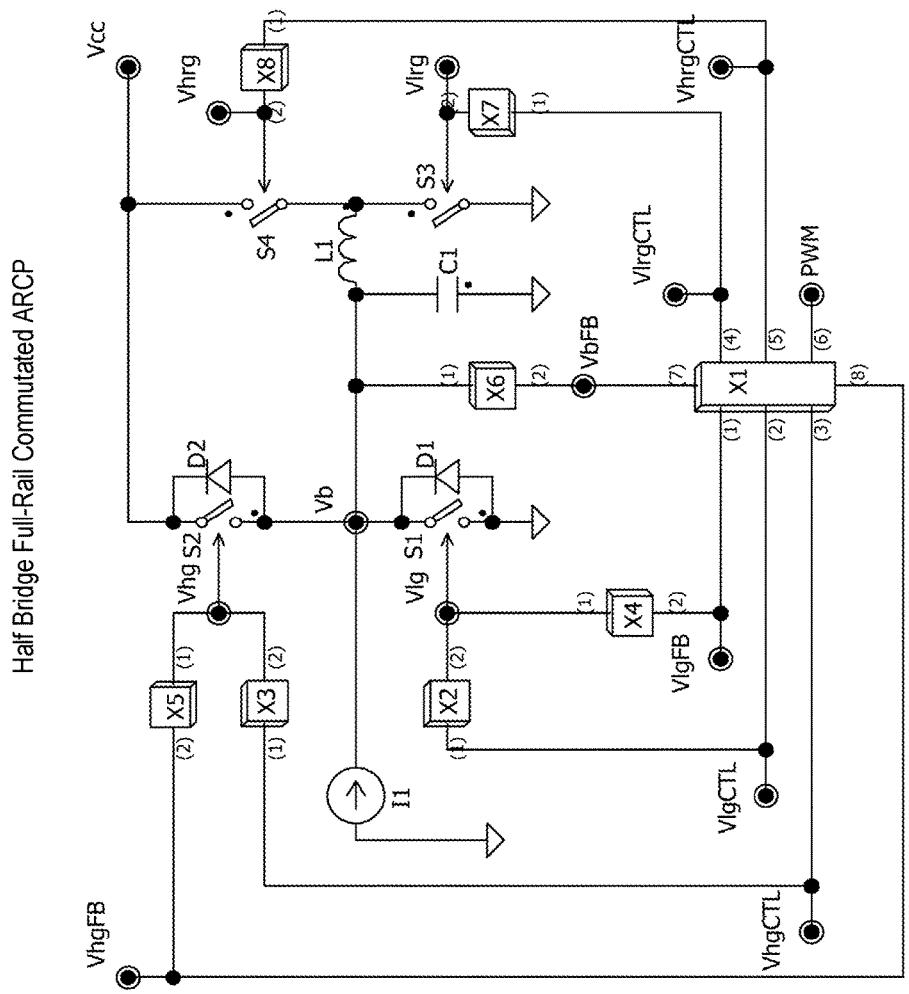
FIG. 17 is a simplified switch-level electrical schematic diagram showing a half bridge full-rail commutated ARCP circuit embodiment.
Figure 18:
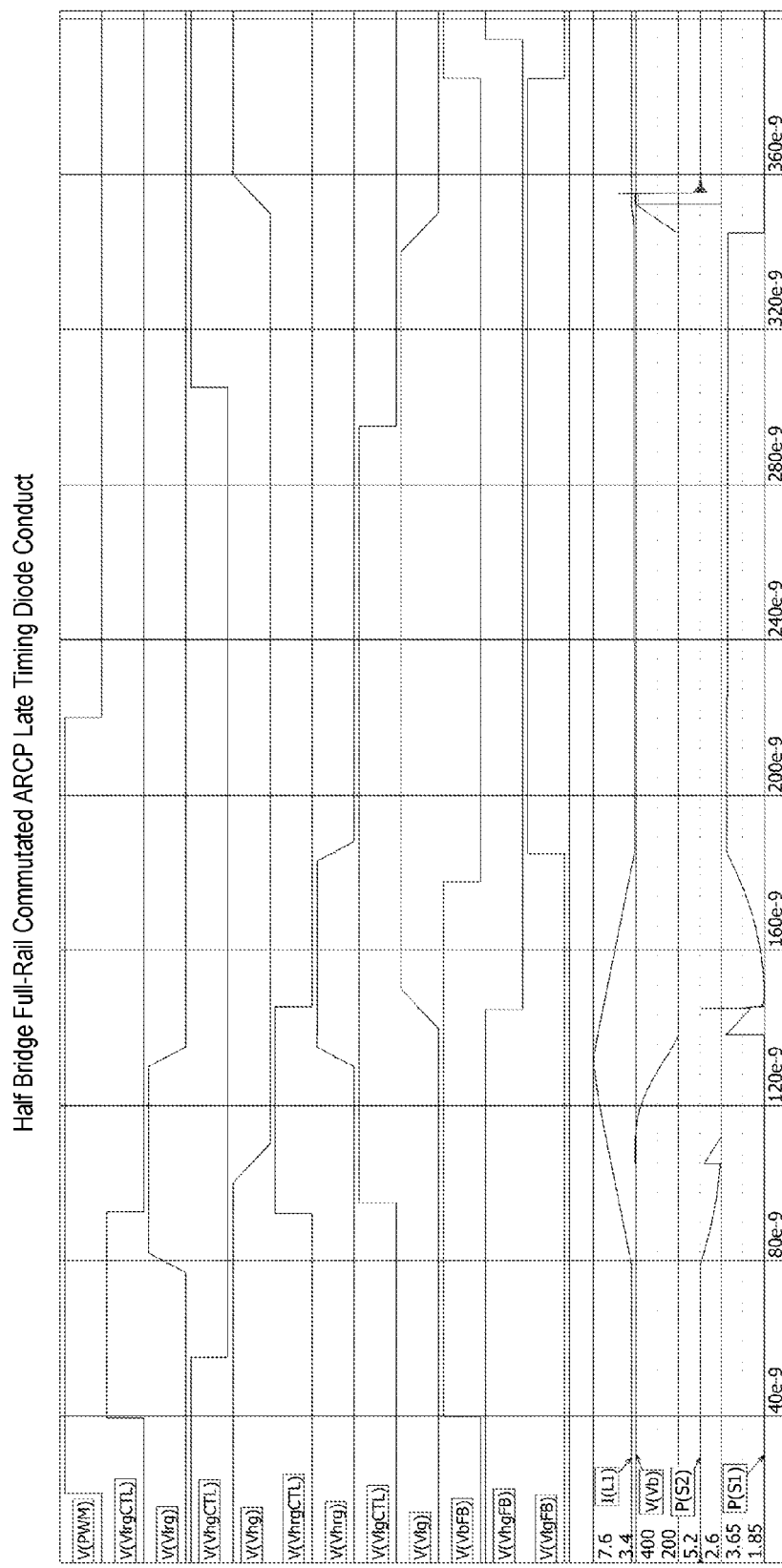
FIGS. 18, 19, and 20 are timing diagrams showing the embodiment of FIG. 17 switched according to long, short, and optimal timing parameters.
Figure 19:
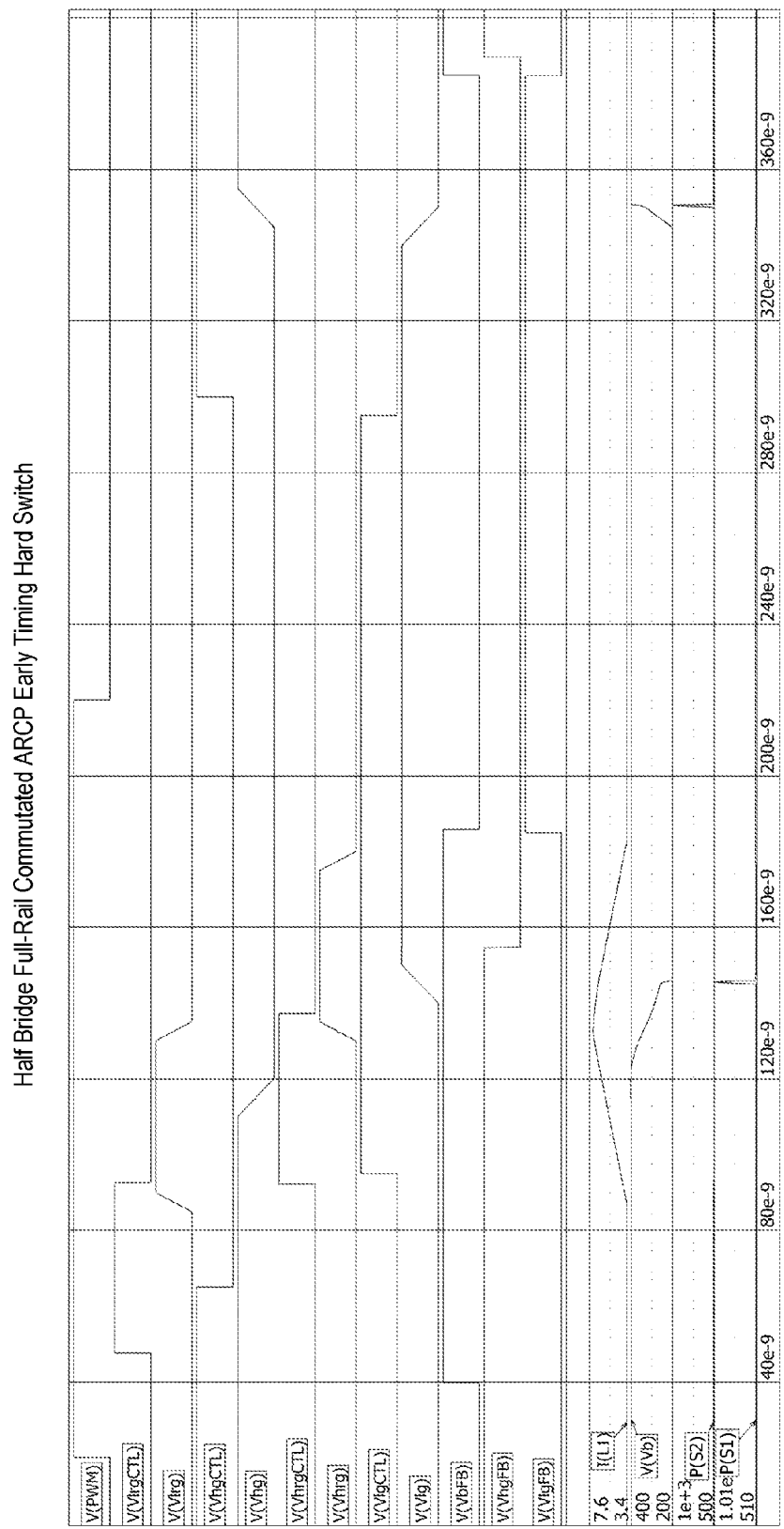
Figure 20:
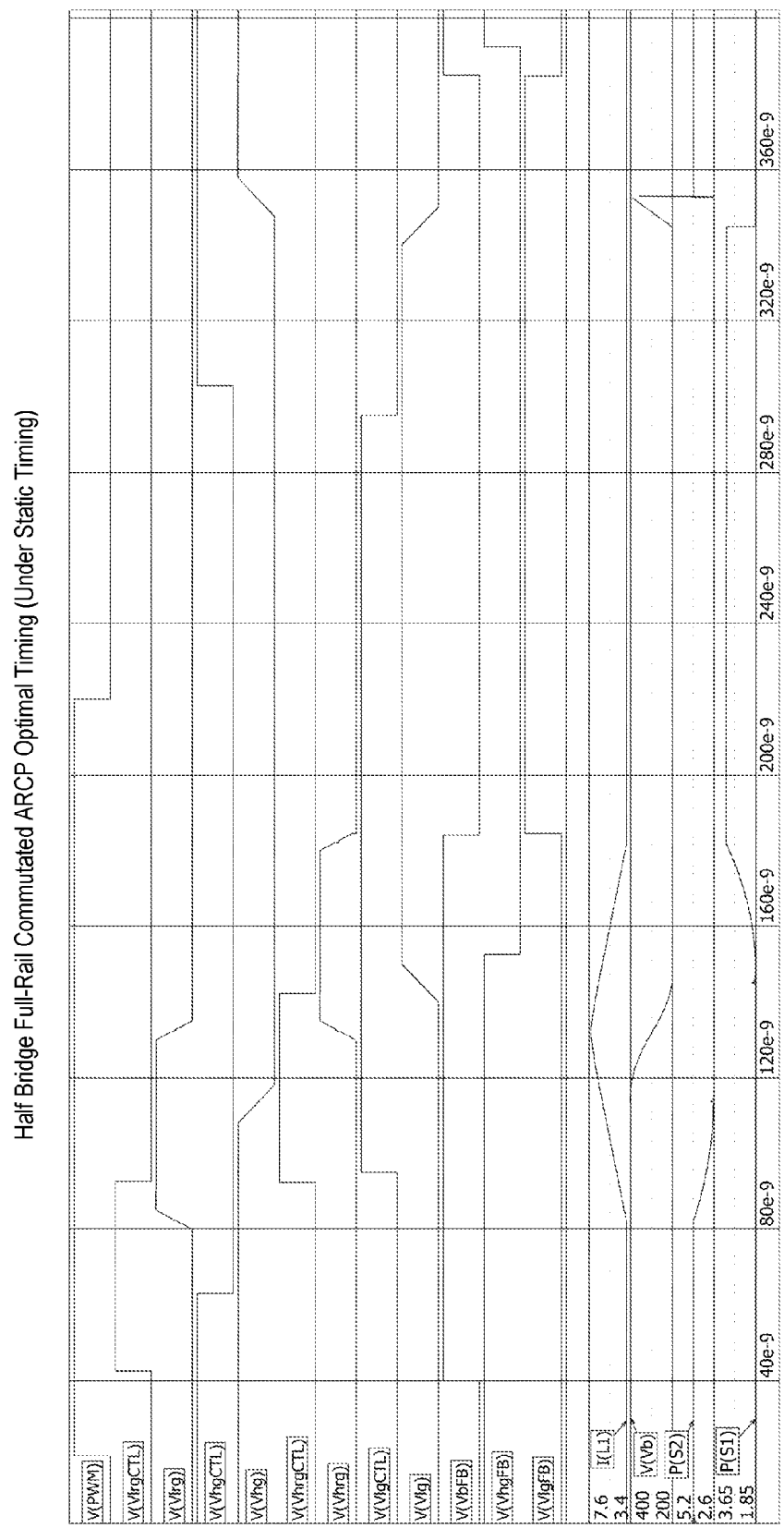
Figure 21:
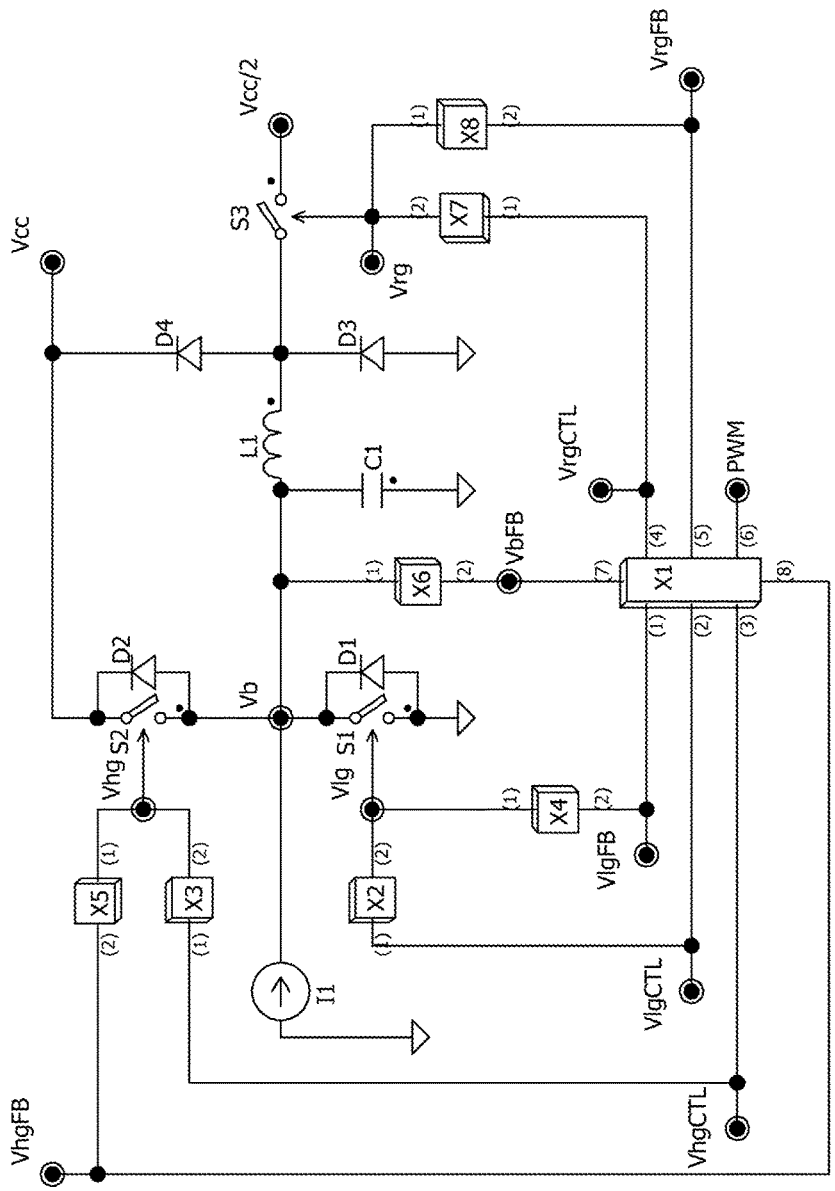
FIG. 21 is a simplified switch-level electrical schematic diagram showing a half bridge mid-rail commutated ARCP circuit embodiment.
Figure 22:
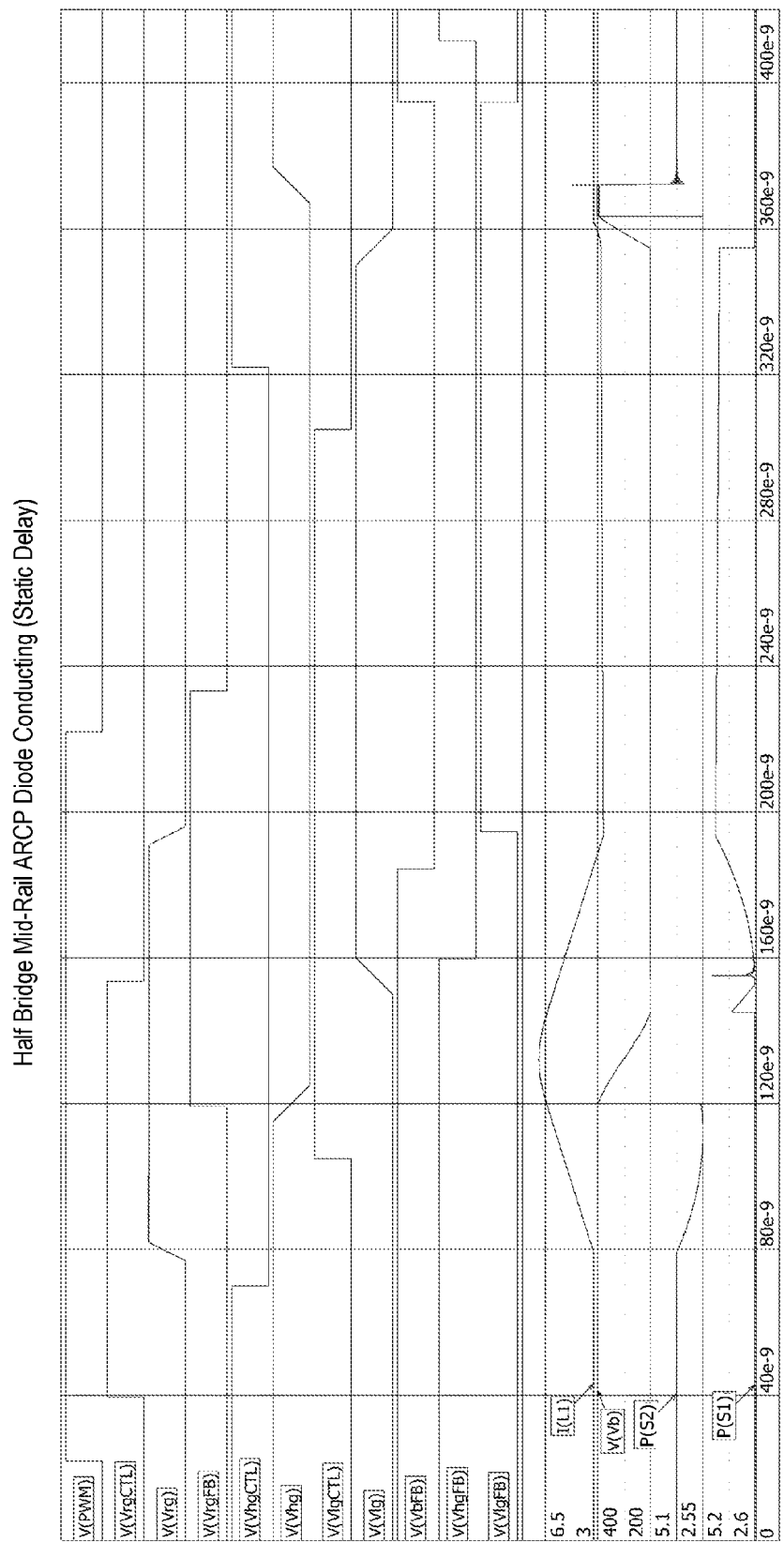
FIGS. 22, 23, and 24 are timing diagrams of the embodiment of FIG. 21 switched according to long, short, and optimal static timing parameters.
Figure 23:
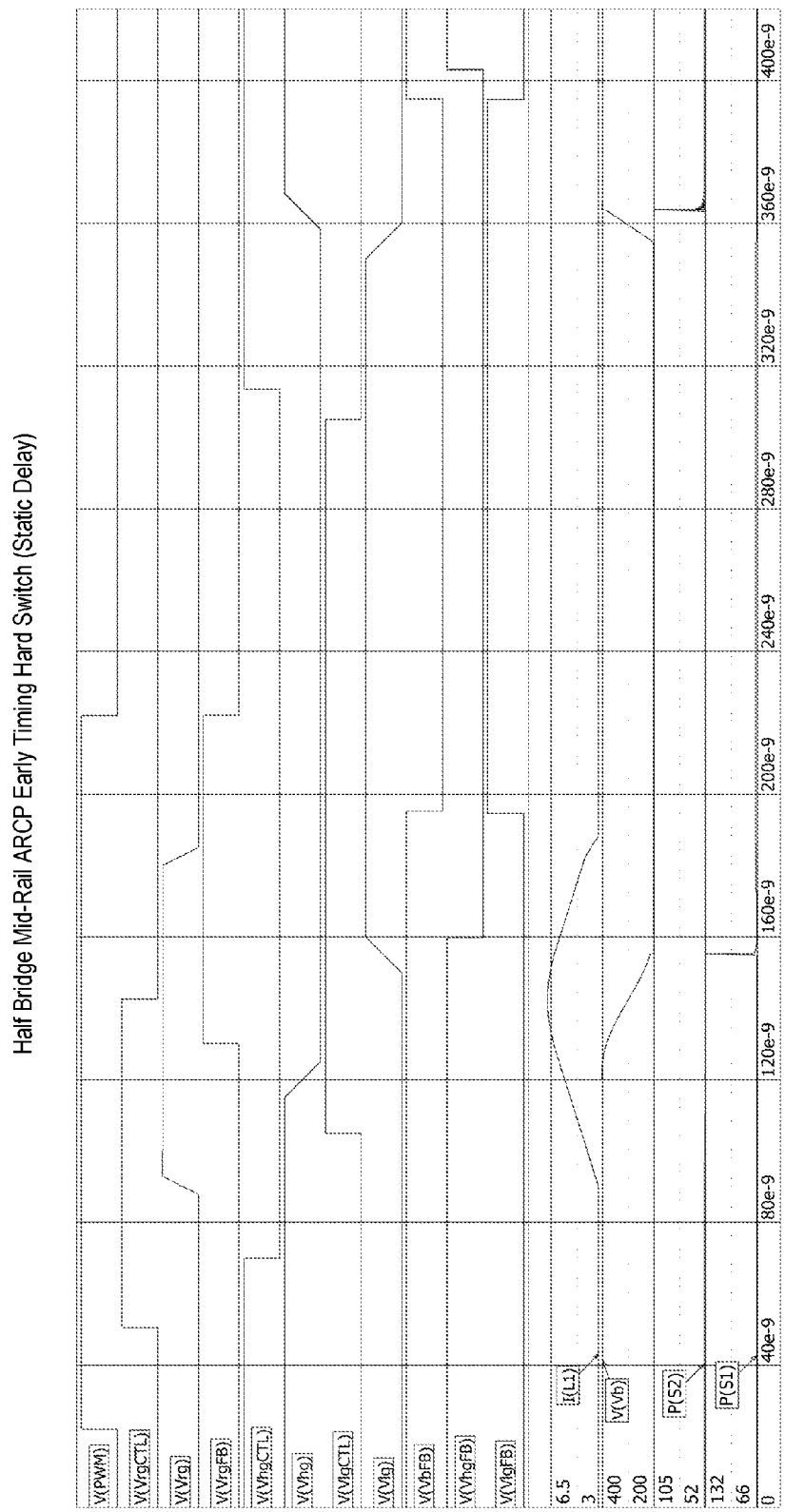

With reference to circuit 250 of FIG. 17, for the forced-resonance transition, note that FIGS. 18-20 show a static timing system, in which there is a fixed time between the timing of the edge of the PWM signal and when Vb falls to zero volts. (A dynamic timing system is shown and described later with reference to FIG. 25). In other words, in the static timing system (also called fixed time offset mode), the time between the incoming PWM change and the Vb transition is held constant. Therefore, after the PWM signal transition, the system waits for some adjustable period before setting VlrgCTL high. The adjustable period establishes a pulse width of first and second portions of the resonant pulse. In other words, the resonant pulse is divided up between low- and high-sides, so the adjustment to the duration of the resonant pulse actually impacts the placement of the rising edge of VlrgCTL and the falling edge of VhrgCTL. The transition time between of these pulses is coincident with the center of the resonant pulse, which aligns with a midpoint of the falling slope of Vb, ensuring that the midpoint of the Vb transition aligns with the peak resonant current I(L1).

In forced-resonant transitions of a statically timed system, there is a fixed window between when the PWM signal changes and the time at which the low-side power switch changes its switching state. There is a fixed system delay between VlrgCTL and VhgCTL. VhgCTL is set low at a fixed time relative to the falling edge of VlrgCTL, which after the set system delay though X3, results in signal Vhg shutting off high-side switch S2.

S2 being off allows Vb to fall once the current in L1 is greater than the incoming current, with a resonant waveform due to L1 and C1.

VhrCTL is set high as VlrCTL is set low, preventing both resonant switching from conducting simultaneously (shoot through). Accordingly, Vlrg and Vhrg transition simultaneously after system delays attributable to X7 and X8 (e.g., gate drivers).

VlgCTL is set high after a fixed time after PWM high transition. With the system delay attributable to X2, Vlg should transition S1 just as Vb reaches zero volts (ZVS).

Vhrg will turn off (after the delay of X8) due to VhrgCTL falling. If timing is correct, L1 current should be zero at this time.

As in previous examples, FIGS. 18-20 show late, early, and optimal timing of the forced-resonant transition. In FIG. 18, the resonant pulse durations controlled by VlrgCTL and VhrgCTL are too long, causing diode conduction. Shortening them ideally produces optimal timing (FIG. 20) for the next PWM low-to-high transition cycle, but it might also cause a hard switch (FIG. 19) if the durations are too short. Likewise, the hard-switch event of FIG. 19 may be detected so that RSC 66 can lengthen the durations of VlrgCTL and VhrgCTL to ideally obtain optimal timing in the following cycle.

For the self-resonance transition, in fixed timing offset mode, VlgCTL turns off a set time after PWM falls. Vb will start to rise (Vb=I*t/C) once Vlg falls. VhgCTL is set high to ensure that Vhg goes high just as Vb reaches the positive rail, after the system delay.

Half Bridge Mid-rail Commutated, ARCP Example

Similar to the previous, full-rail example, in mid-rail circuit 252 a resonant switch feedback signal (VrgFB) is used to center the mid-rail resonant pulse with the Vb signal to ensure that the peak resonant current I(L1) is aligned with a midpoint of the falling slope of Vb. It is also possible to compare the resonant inductor L1 current zero crossing with the end of the resonant pulse, allowing further accuracy and reducing risk of reversing current or voltage spikes across resonant switches due to turn off under current.

Static and Dynamic RSC Timing

Figure 24:
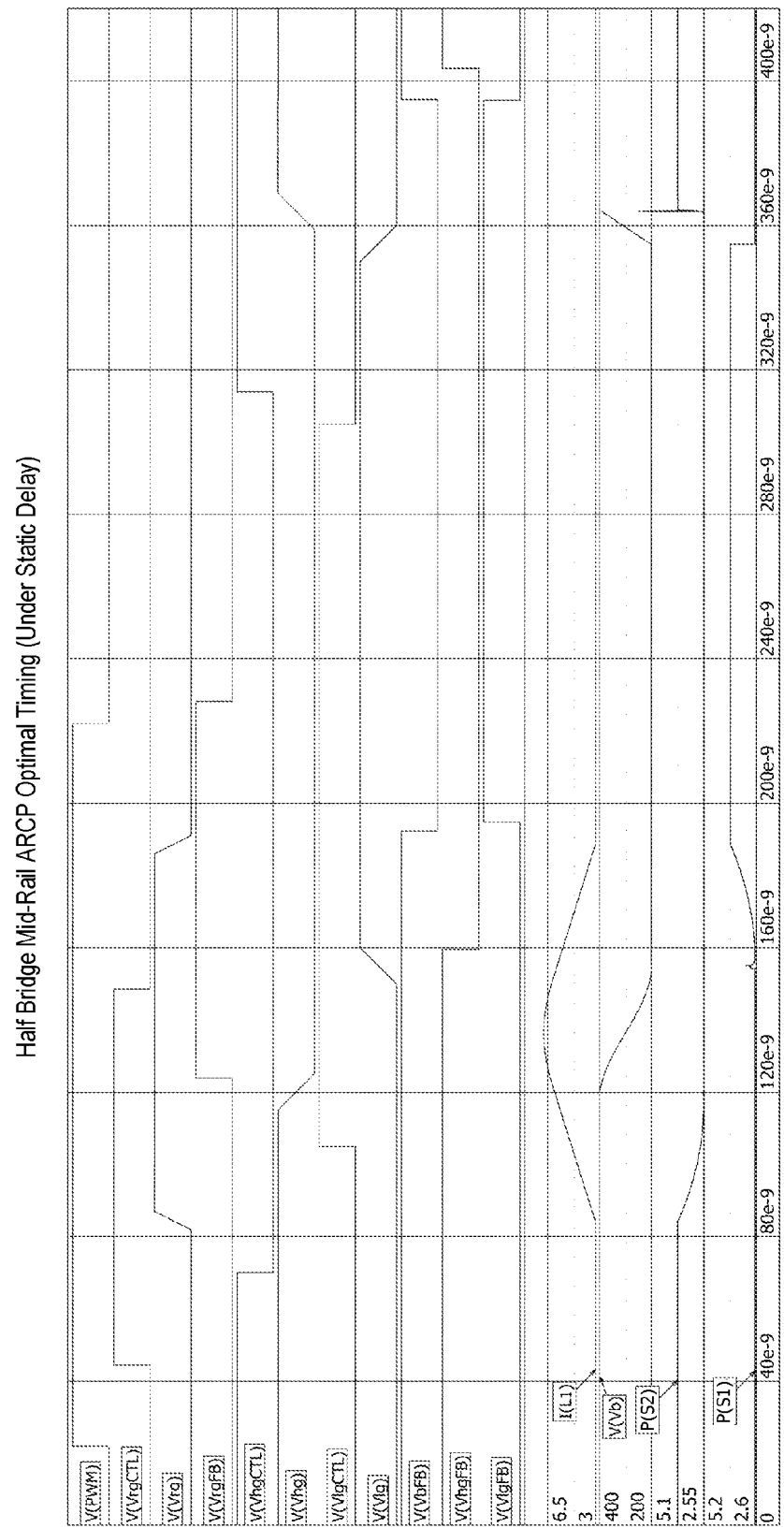
Figure 25:
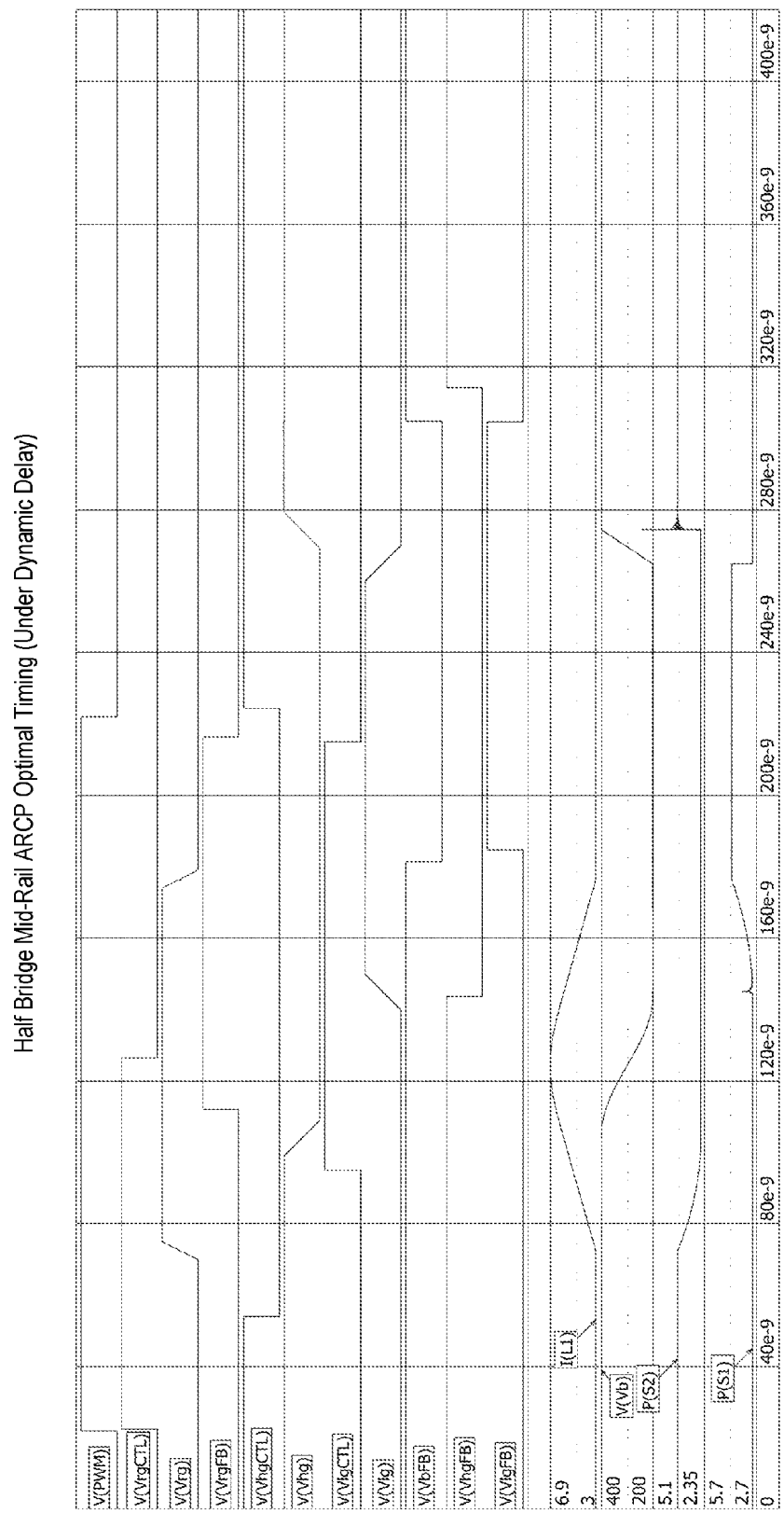
FIG. 25 is a timing diagram of the embodiment of FIG. 21 switched according to optimal dynamic timing parameters.

With reference to FIGS. 24 and 25, static (or dynamic) timing refers to the time delay between the PWM edge event and the corresponding Vb transition.

Under static timing, RSC 66 sets a fixed amount of time within which to perform soft switching. Accordingly, time is fixed for when the resonant pulse ends and when a power device is turned on (in an attached low side power switch). Thus, the start of the resonant pulse is allowed to vary, from instantly after PWM (maximum) to diminishing off (minimum) at the static end so specified. An advantage of static timing is that Vb's transition relative to that of the PWM signal is static. On the other hand, the PWM-to-Vb delay has a period that is sufficiently large to accommodate all current and Vcc conditions.

Under dynamic timing, the falling resonant pulse edge and turning on power device are permitted to move closer or further from instantiating PWM pulse depending on resonant pulse width. Note that while in the example, the resonant pulse start is immediately after PWM, but it could also be allowed to move depending on how much compression is desired for a system. An advantage of dynamic timing is that the delay time is dynamic and therefore flexible to allow for a large range of current and Vcc. Dynamic has a narrower 'low' duty on Vb, which is what counters compression in class-D amplifiers, whereas the static Vb 'low' is basically the same as PWM. On the other hand, Vb duty cycle is no longer that of PWM in dynamic timing systems.

Symmetrical Full Bridges with Shared ARCP

Symmetry in a full bridge, where each bridge node (Vb) has equal but opposite current, allows some unique capabilities. Firstly, it mimics a mid-rail as the opposing bridge voltage is always equal but opposite. This also means that just one inductor can provide forced resonant ZVS for both sides simultaneously. Skilled persons will note that the order of arrangement of the resonant switches and inductor is irrelevant to forced resonance since all components are in series, allowing the designer to place the switches and magnetics in an arrangement that best suits the particular specification. An additional advantage is that, due to symmetry, it can be assumed that so long as all power switching devices are the same, that which occurs on one switch, will also occur to its diagonally opposed equivalent on the opposite bridge. This allows for low/ground side sensing of Vg and Vb, since the high-side switch states can be inferred from the low-side equivalent, thereby reducing the complexity and cost of the system.

Bridgeless PFC

Despite being a full bridge with asymmetric operation, this disclosure demonstrates that asymmetric topologies can reuse a common resonant inductor and single resonant switch between halves, thereby reducing duplication.

Figure 28:
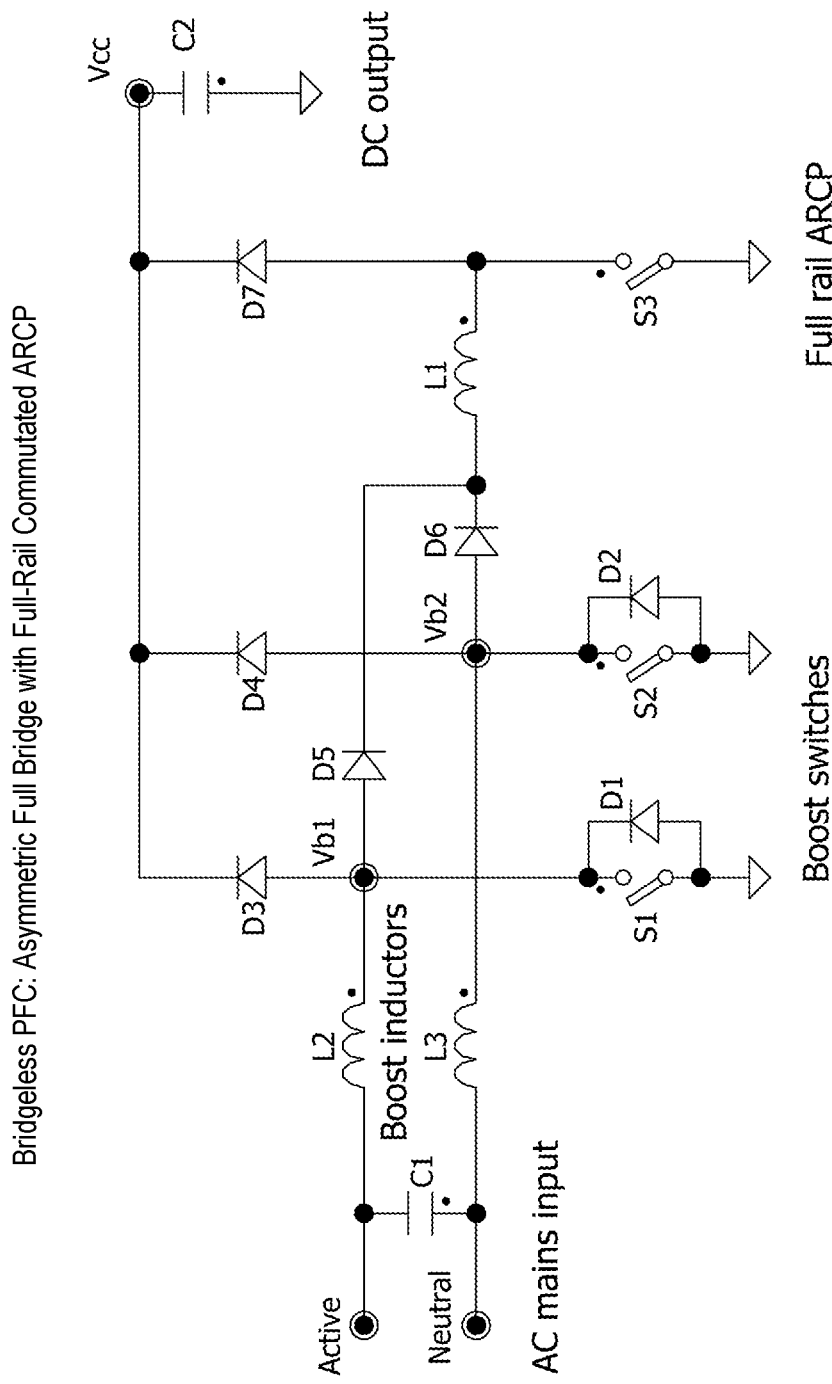
FIGS. 28 and 29 are simplified switch-level electrical schematic diagrams showing bridgeless power factor correction (PFC) full- and mid-rail commutated ARCP circuit embodiments.
Figure 29:
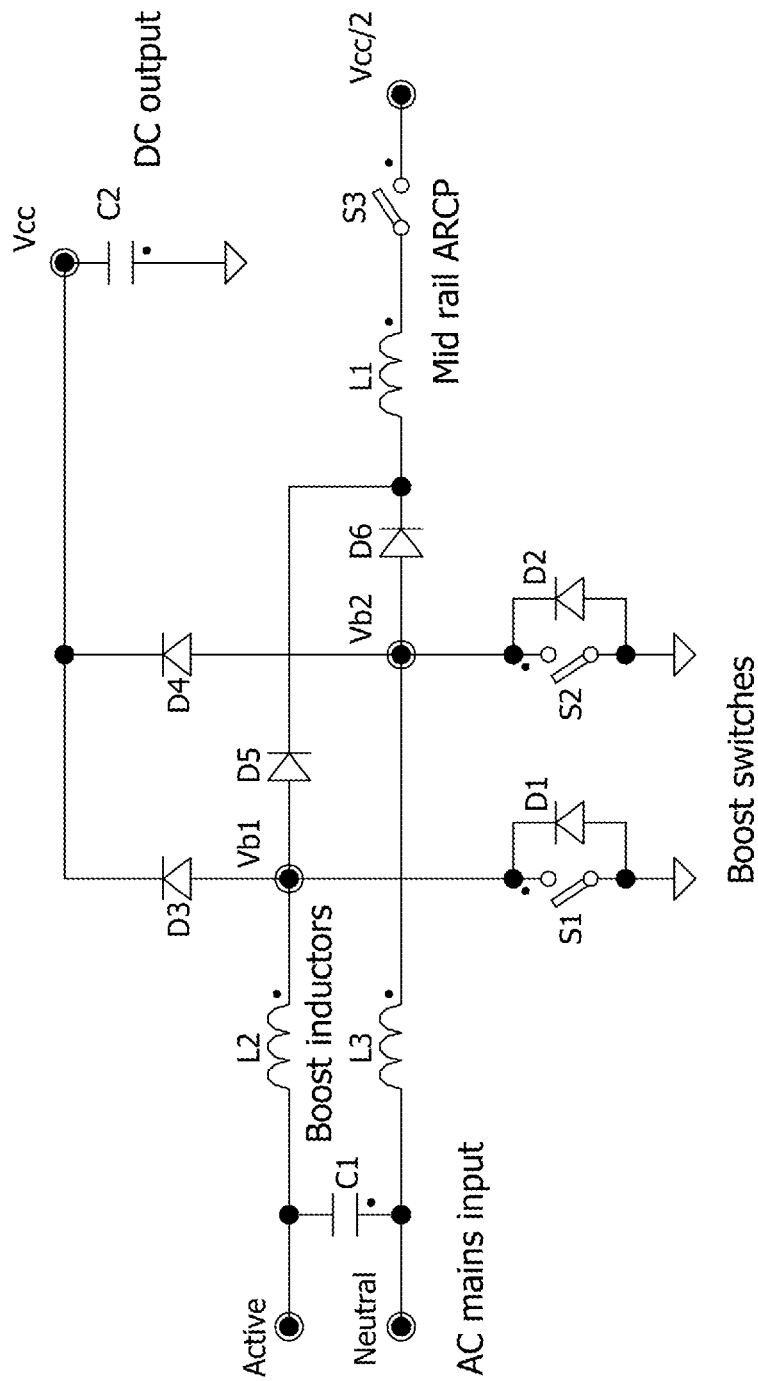

While the simplest form of PFC would use a full bridge rectifier with either a mid- or full-rail commutated ARCP system as described, the rectifier adds considerable power loss due to the forward-conduction losses of the bridge rectifier. FIGS. 28 and 29 demonstrate two bridgeless alternatives, which appear as two boosters, one for each AC line-in. As with other bridgeless PFC systems, only the power switch with voltage polarity opposed to the antiparallel diode (body diode in the case of a MOSFET) switches, performing a booster operation. The other is turned on during the same periods as it is experiencing the opposite negative voltage, which would otherwise conduct through its antiparallel diode, as per a normal bridge rectifier.

By using diodes in series with either a full- or mid-rail ARCP, both edges can use the same ARCP when it is their turn to boost, reducing part count and cost.

Hard Switch and Switching-Node Voltage Detection

In a typical implementation, PSS reduces but does not entirely eliminate switching losses because there is always some finite conduction or switching loss. Accordingly, in some embodiments, RSC 66 makes corrections so that soft switching occurs when a switching-node voltage or other voltage across a switch (e.g., drain-to-source voltage) is predicted to be within some desired threshold—such as less than 15 volts across a switch—during the moment preceding when the switching-node voltage was observed completing its transition (e.g., Vb falls to ground). For example, a change in the switch state occurring at 14 volts and at a time that is just before the observed switching-node voltage collapses to its minimum detected level is deemed to be a satisfactory soft switch. But switching at 15 volts or higher is recognized as a hard switch. Likewise, switching at 5 volts, but after the switching-node voltage has already reached its minimum detected value, is deemed to have caused body diode conduction losses.

The desired threshold (e.g., 15 volts) detection may be implemented by a comparator that outputs a low digital value when a monitored switching-node voltage (e.g., V(VbFB)) is within the desired threshold, and a high digital value when the monitored voltage is outside of the desired threshold. The comparator output may be coupled to asynchronous digital circuitry (FIGS. 30-32) that detects whether the comparator output is changed while a hard-switching or other lossy condition exists. In other words, the asynchronous digital circuitry provides an indication of a timing adjustment to make so as to actuate a switch when a condition exists at which negligible switching losses would result.

Figure 30:
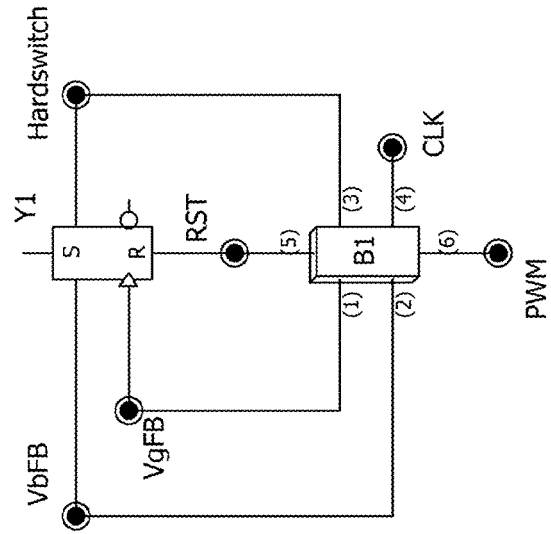
FIG. 30 is a simplified electrical schematic showing hard-switch detection and noise-suppression circuitry used to indicate timing errors in attempts to switch during predicted soft-switching conditions at a switching-node, Vb.

FIG. 30 shows an example of a hard-switch detection circuit combined with the recording buffers. The circuit includes a signal recording and analysis block B1, and a set-reset (SR) flip-flop Y1 acting as an asynchronous logic unit (i.e., it is not clocked by CLK used in B1). The asynchronous logic flip-flop is free to gate the state of VbFB upon the precise transition of VgFB, thereby improving the quality of any momentary state VbFB may have. This reduces the chance of any data corruption in either signal which are prone to oscillate, particularly in the event of a hard switch event.

B1 resets Y1 upon a PWM edge event, clearing any old data stored data while still blocking any false triggers that may occur during the early part of the transition when no legitimate transition can occur, such as before the resonant pulse has started and meaning that any change in Vb should be impossible. After clearing, Y1 is free to capture the state of VbFB in response to VgFB asynchronously triggering a clock of Y1.

Simultaneously, B1 is also buffering the states of VgFB, VbFB, and Hardswitch. Upon completion of a chosen maximum window size, recording stops. B1 then performs an algorithm that sets the next output buffers based on which happened first to adjust a timing parameter during a next cycle. For example, if VbFB falls low before either VgFB or Hardswitch, then the time difference between VbFB and VgFB is detected and used to decrease, e.g., the pulse width of the resonant pulse width. If Vg or Hardswitch go high before the first low occurrence of VbFB, then a hard-switching event occurred and the resonant pulse width is increased. In the event that the resonant pulse reaches a chosen maximum and soft switching is still not occurring, the system is deemed to be faulting out of its safe operating zone, in that system current is too great to allow ZVS for a given system voltage and maximum allowable resonant charge time.

In some embodiments, blocks B1 and Y1 are included in RSC 66 circuitry. In another embodiment, SR flip-flop Y1 is included in a gate driver, such as X2. Accordingly, flip-flops or other hard-switching detection circuitry be located proximal to switches so that hard-switching detection circuitry provides RSC 66 a digital signal (V(Hardswitch)) indicating hard switching.

In some embodiments, a rate of change of a voltage (e.g., dVb/dt, dVg/dt, or the like) may be monitored for detecting sudden changes that provide further information. The additional information may be used in at least two capacities: it may be used to detect hard switching, and it may be used to characterize whether a resonant tank actually had supplied insufficient current by which to fully transition the state of the switching node voltage. Examples of these two uses are as follows in the next two paragraphs.

First, hard switching can be detected by sensing voltages at nodes other than at a switching node like Vbridge or Vb. For example, hard switching also produces spurious noise (e.g., ringing) at a control terminal of a switch (e.g., a gate of a MOSFET), which can be used to detect a hard-switching event. A plateau or dip in Vg during its turn-on time can also indicates a hardswitch event. In such cases, the timing may be adjusted without ever directly monitoring V(Vbridge) for the purpose of detecting hard switching.

Second, when there is insufficient tank current, i.e., insufficient current coming out of a switching node during forced resonance, the switching node voltage initially falls, but then it actually starts to rise again before ever having reached its desired soft-switching threshold. This fall-then-rise pattern in Vb (without triggering a threshold) is another form of detectable hard-switching event in some embodiments.

Skilled persons will understand that many changes may be made to the details of the above-described embodiments without departing from the underlying principles of the invention. For example, a three-phase inverter may be comprised of three half bridges described previous. Also, an ARCP may use MOSFETs for resonant switching devices, but other switching devices may be used. The scope of the present invention should, therefore, be determined only by the following claims.

The invention claimed is:

1. A method of reducing switching losses during successive switch-mode power supply (SMPS) cycles of an SMPS comprising first and second electrically coupled switches that change switching states in response to, respectively, first and second signals, the successive SMPS cycles including first and second SMPS cycles in which the second SMPS cycle follows the first SMPS cycle, the method comprising:
   generating during the first SMPS cycle the first signal at a first time to change a first switching state of the first switch;
   generating during the first SMPS cycle the second signal at a second time to change a second switching state of the second switch, the second time temporally displaced from the first time based on a timing parameter, the timing parameter being adjustable to coordinate the second switch changing its switching state when a soft-switching condition exists, the soft-switching condition characterized by a condition at which minimum hard-switching and diode conduction losses would result from the second switch changing its switching state;
   detecting a failure to adequately soft switch the second switch during the first SMPS cycle and whether the failure is attributable to a first or second timing error between when the second switch changes its switching state and when the soft-switching condition actually occurs for the first SMPS cycle, the first and second timing errors occurring when the second switch changes its switching state, respectively, before and after when the soft-switching condition actually occurs for the first SMPS cycle;
   in response to detecting the first timing error, adjusting, for the second SMPS cycle, the timing parameter to reduce hard-switching loss by causing the second time at which the second signal is generated to be delayed during the second SMPS cycle; and
   in response to detecting the second timing error, adjusting, for the second SMPS cycle, the timing parameter to reduce diode conduction loss by causing the second time at which the second signal is generated to be advanced during the second SMPS cycle.

2. The method of claim 1, further comprising detecting the failure to adequately soft switch by receiving a signal indicating a hard switch of the second switch.

3. The method of claim 1, further comprising detecting the failure to adequately soft switch by detecting a delay between the second switch changing its switching state and a change in state of a switching node associated with the second switch.

4. The method of claim 1, further comprising adjusting the timing parameter by changing a pulse width of a resonant pulse corresponding to at least a portion of the first signal.

5. The method of claim 1, further comprising adjusting the timing parameter to facilitate a change in a deadtime between the first and second signals.

6. The method of claim 1, further comprising sensing a level of a voltage across the second switch to detect the failure to adequately soft switch.

7. The method of claim 1, further comprising sensing a level of a voltage at a switching node between the first and second switches to detect the failure to adequately soft switch.

8. The method of claim 1, in which the first and second switches are coupled together at a node of a self-, forced-, or quasi-resonant system.

9. The method of claim 1, further comprising adjusting the timing parameter to maintain a substantially static period between a start of the first SMPS cycle and a desired value of a voltage at a switching node associated with the second switch.

10. The method of claim 1, further comprising adjusting the timing parameter to maintain a dynamic timing between a start of the first SMPS cycle and a desired value of a voltage at a switching node associated with the second switch.

11. A resonant system controller (RSC) apparatus to reduce switching losses during successive switch-mode power supply (SMPS) cycles of an SMPS comprising first and second electrically coupled switches that change switching states in response to, respectively, first and second signals, the successive SMPS cycles including first and second SMPS cycles in which the second SMPS cycle follows the first SMPS cycle, the apparatus comprising:
   a first control output to provide during the first SMPS cycle the first signal at a first time to change a first switching state of the first switch;
   a second control output to provide during the first SMPS cycle the second signal at a second time to change a second switching state of the second switch, the second time temporally displaced from the first time based on a timing parameter, the timing parameter being adjustable to coordinate the second switch changing its switching state when a soft-switching condition exists, the soft-switching condition characterized by a condition at which minimum hard-switching and diode conduction losses would result from the second switch changing its switching state;
   sensor feedback inputs to receive feedback signals including information for detecting a failure to adequately soft switch the second switch during the first SMPS cycle and whether the failure is attributable to a first or second timing error between when the second switch changes its switching state and when the soft-switching condition actually occurs for the first SMPS cycle, the first and second timing errors occurring when the second switch changes its switching state, respectively, before and after when the soft-switching condition actually occurs for the first SMPS cycle; and circuitry configured:

in response to detecting the first timing error, adjust, for the second SMPS cycle, the timing parameter to reduce hard-switching loss by causing the second time at which the second signal is generated to be delayed during the second SMPS; and in response to detecting the second timing error, adjusting, for the second SMPS cycle, the timing parameter to reduce diode conduction loss by causing the second time at which the second signal is generated to be advanced during the second SMPS cycle.

12. The apparatus of claim 11, in which the information of the feedback signals includes timing information indicating a hard switch of the second switch.

13. The apparatus of claim 11, in which the timing information indicates a delay between the second switch changing its switching state and a change in state of a switching node associated with the second switch.

14. The apparatus of claim 11, in which the circuitry is further configured to adjust the timing parameter by changing a pulse width of a resonant pulse corresponding to at least a portion of the first signal.

15. The apparatus of claim 11, in which the circuitry is further configured to adjust the timing parameter to facilitate a change in a deadtime between the first and second signals.

16. The apparatus of claim 11, in which the information of the feedback signals includes a level of a voltage across the second switch.

17. The apparatus of claim 11, in which the information of the feedback signals includes a level of a voltage at a switching node between the first and second switches.

18. The apparatus of claim 11, in which the first and second switches are resonantly coupled to form a forced-resonant auxiliary resonant commutated pole (ARCP) system.

19. The apparatus of claim 11, in which the first and second switches are coupled together at a node of a self-resonant system.

20. The apparatus of claim 11, in which the circuitry is further configured to adjust the timing parameter to maintain a substantially static period between a start of the first SMPS cycle and a desired value of a voltage at a switching node associated with the second switch.

21. The apparatus of claim 11, in which the circuitry is further configured to adjust the timing parameter to maintain a dynamic timing between a start of the first SMPS cycle and a desired value of a voltage at a switching node associated with the second switch.

22. A power supply system including the apparatus of claim 11.

* * * * *